United States Patent
Huang et al.

(10) Patent No.: US 11,625,468 B2
(45) Date of Patent: Apr. 11, 2023

(54) INPUT METHOD AND ELECTRONIC DEVICE

(71) Applicant: Huawei Technologies Co., Ltd., Shenzhen (CN)

(72) Inventors: Jiejing Huang, Shenzhen (CN); Huangwei Wu, Shenzhen (CN); Xi Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/363,344

(22) Filed: Jun. 30, 2021

(65) Prior Publication Data

US 2021/0397689 A1  Dec. 23, 2021

Related U.S. Application Data

(63) Continuation of application No. 16/613,511, filed as application No. PCT/CN2017/084602 on May 16, 2017, now Pat. No. 11,086,975.

(51) Int. Cl.
| | |
|---|---|
| *G06F 21/32* | (2013.01) |
| *G06F 3/04817* | (2022.01) |
| *G06F 3/04886* | (2022.01) |
| *G06V 40/12* | (2022.01) |

(52) U.S. Cl.
CPC .......... *G06F 21/32* (2013.01); *G06F 3/04817* (2013.01); *G06F 3/04886* (2013.01); *G06V 40/1365* (2022.01); *G06F 2203/04803* (2013.01)

(58) Field of Classification Search
CPC .. G06F 3/04817; G06F 3/04886; G06F 21/32; G06V 40/1365
See application file for complete search history.

(56) References Cited

U.S. PATENT DOCUMENTS

| | | | |
|---|---|---|---|
| 7,486,810 | B1 | 2/2009 | Accapadi |
| 8,611,422 | B1 | 12/2013 | Yagnik et al. |
| 2007/0152978 | A1 | 7/2007 | Kocienda et al. |
| 2008/0115208 | A1 | 5/2008 | Lee |
| 2009/0327744 | A1* | 12/2009 | Hatano .............. G06F 21/32 726/19 |
| 2013/0272586 | A1* | 10/2013 | Russo ................ G06V 40/50 382/124 |
| 2015/0025876 | A1 | 1/2015 | Ghassabian |
| 2015/0052096 | A1 | 2/2015 | Xiao |

(Continued)

FOREIGN PATENT DOCUMENTS

| | | |
|---|---|---|
| CN | 101470732 A | 7/2009 |
| CN | 101667060 A | 3/2010 |

(Continued)

*Primary Examiner* — Seth A Silverman
(74) *Attorney, Agent, or Firm* — Conley Rose, P.C.

(57) ABSTRACT

Embodiments of this application provide an input method. The input method may be implemented in an electronic device that has a fingerprint collection device, and the method includes: when a text input application runs, obtaining, by the electronic device, a fingerprint of a user on a touchscreen; determining, by the electronic device when the fingerprint is a prestored registered fingerprint, a target lexicon associated with the fingerprint; and providing, by the electronic device by using the target lexicon, at least one candidate word corresponding to a current input event.

20 Claims, 24 Drawing Sheets

(56) References Cited

U.S. PATENT DOCUMENTS

| | | | |
|---|---|---|---|
| 2015/0082240 A1 | 3/2015 | Ording et al. | |
| 2015/0333910 A1* | 11/2015 | Kirdahy | G06F 21/34 |
| | | | 713/186 |
| 2016/0063259 A1 | 3/2016 | Bhansali et al. | |
| 2016/0203306 A1 | 7/2016 | Boshra | |
| 2016/0261589 A1 | 9/2016 | Pierce et al. | |
| 2016/0299679 A1* | 10/2016 | Park | G04G 9/0064 |
| 2016/0379033 A1* | 12/2016 | Liu | G06V 40/1306 |
| | | | 382/124 |
| 2017/0155802 A1 | 6/2017 | Takahashi | |
| 2017/0308732 A1* | 10/2017 | Wang | G06F 3/0488 |
| 2019/0098124 A1* | 3/2019 | Guo | G06V 40/1365 |
| 2019/0227707 A1 | 7/2019 | Jinxin | |

FOREIGN PATENT DOCUMENTS

| | | |
|---|---|---|
| CN | 101867650 A | 10/2010 |
| CN | 102063452 A | 5/2011 |
| CN | 103389979 A | 11/2013 |
| CN | 105138266 A | 12/2015 |
| CN | 105159475 A | 12/2015 |
| CN | 105302329 A | 2/2016 |
| CN | 105700699 A | 6/2016 |
| CN | 105718147 A | 6/2016 |
| KR | 20080091199 A | 10/2008 |
| KR | 20090053851 A | 5/2009 |
| WO | 2015079450 A2 | 6/2015 |

\* cited by examiner

INPUT METHOD AND ELECTRONIC DEVICE

CROSS-REFERENCE TO RELATED APPLICATIONS

This application is a continuation of U.S. patent application Ser. No. 16/613,511, filed on Nov. 14, 2019, which is a National Stage of International Application No. PCT/CN2017/084602 filed on May 16, 2017. Both of the aforementioned applications are hereby incorporated by reference in their entireties.

TECHNICAL FIELD

Embodiments of this application relate to the field of communications technologies, and in particular, to an input method and an electronic device.

BACKGROUND

Currently, when a user enters information by using a text input application, the text input application may create a personal lexicon for the user based on an input habit of the user. For example, if a user A frequently enters a word "certificate", the text input application may store the word "certificate" in a personal lexicon of the user A as a frequently used word. Subsequently, after the user A logs in to an account of the user A on the text input application by using a password, the text input application calls, for the user A, the personal lexicon corresponding to the user A. In this case, if the user enters characters "cert" again, the text input application may prompt the user with the word "certificate" as a first candidate word.

Therefore, when a different user uses a same text input application, for example, when a different user uses a same text input application on a same mobile phone or computer to enter information, the user needs to first manually log in to an account of the user, so that the text input application calls a personal lexicon corresponding to the user that currently performs an operation, to implement an input function such as the foregoing word association that conforms to an input habit of the user. It can be learned that an implementation process of the input method is relatively complex. Each time the user uses the text input application, the user needs to manually log in to the account of the user, to complete input by using the personal lexicon that conforms to the input habit of the user. Consequently, input efficiency is relatively low.

SUMMARY

Embodiments of this application provide an input method and an apparatus, so that when a plurality of users share a same text input application, a process in which the user logs in to the text input application can be simplified, and input efficiency and human-machine interaction intelligence can be improved.

To achieve the foregoing objectives, the following technical solutions are used in the embodiments of this application.

According to a first aspect, an embodiment of this application provides an input method, where the input method is implemented in an electronic device that has a fingerprint collection device, and the method includes: when a text input application runs, obtaining, by the electronic device, a fingerprint of a user on a touchscreen; determining, by the electronic device when the fingerprint is a prestored registered fingerprint, a target lexicon associated with the fingerprint; and providing, by the electronic device by using the target lexicon, at least one candidate word corresponding to a current input event.

In other words, when the user uses the text input application, the electronic device may perform authentication on the user by using the fingerprint of the user that occurs when the user enters information in an input interface, to invoke, based on an authentication result, a personal lexicon corresponding to the user. In a subsequent input process, the electronic device may determine a candidate word of the current input event for the user by using the personal lexicon. In this way, when a different user uses the text input application on the same electronic device, the electronic device can automatically invoke, for the different user based on a fingerprint of the user without awareness of the user, a personal lexicon that conforms to an input habit of the user, to prompt a related candidate word, thereby improving input efficiency of the input method, reducing a probability of user privacy leakage caused by confusion of lexicons of different users, and improving human-machine interaction intelligence.

In a possible design method, when there is one fingerprint, the determining, by the electronic device, a target lexicon associated with the fingerprint includes: determining, by the electronic device, a personal lexicon corresponding to the fingerprint as the target lexicon based on a correspondence between a personal lexicon of a different user and a registered fingerprint of the different user.

In a possible design method, when the fingerprint is an unregistered fingerprint, the electronic device may use, as a new user that is not registered with the electronic device, the user that currently operates the text input application, and the electronic device may establish a temporary personal lexicon corresponding to the fingerprint.

In a possible design method, after the establishing, by the electronic device, a temporary personal lexicon corresponding to the fingerprint, the method further includes: when a similarity between the temporary personal lexicon and a personal lexicon of a first user is greater than a threshold, adding, by the electronic device, the temporary personal lexicon to the personal lexicon of the first user; and establishing, by the electronic device, a correspondence between the fingerprint and the personal lexicon of the first user in the correspondence.

In this way, different lexicons corresponding to a same user can be identified by determining a similarity between lexicons corresponding to different fingerprints. Therefore, after different lexicons corresponding to a same user are combined, a personal lexicon of the user can be enriched and optimized, and accuracy of subsequently using the text input application by the user can be improved.

In a possible design method, there are N fingerprints, and N is an integer greater than 1; and the determining, by the electronic device when the fingerprint is a prestored registered fingerprint, a target lexicon associated with the fingerprint includes: when at least one of the N fingerprints is a registered fingerprint, determining, by the electronic device, a personal lexicon corresponding to the registered fingerprint as the target lexicon based on a correspondence between a personal lexicon of a different user and a registered fingerprint of the different user.

In a possible design method, when the N fingerprints include X registered fingerprints and Y unregistered fingerprints, $X+Y=N$, $X \geq 1$, and $Y \geq 1$; and the method further includes: establishing, by the electronic device, a correspondence between the Y unregistered fingerprints and the target lexicon in the correspondence, so that the electronic device can accurately invoke a corresponding target lexicon subsequently based on an updated correspondence.

In a possible design method, the N fingerprints include Z registered fingerprints, $1<Z\leq N$, and the method further includes: determining, by the electronic device based on the correspondence, whether all of the Z registered fingerprints are corresponding to a same personal lexicon; and when there are different personal lexicons in personal lexicons corresponding to registered fingerprints in the Z registered fingerprints, combining, by the electronic device, personal lexicons corresponding to the Z registered fingerprints into one personal lexicon.

In a possible design method, when the N fingerprints are all unregistered fingerprints, the method further includes: establishing, by the electronic device, a temporary personal lexicon corresponding to the N fingerprints.

In a possible design method, after the establishing, by the electronic device, a temporary personal lexicon corresponding to the N fingerprints, the method further includes: when a similarity between the temporary personal lexicon and a personal lexicon of a second user is greater than a threshold, adding, by the electronic device, the temporary personal lexicon to the personal lexicon of the second user; and establishing, by the electronic device, a correspondence between the fingerprints and the personal lexicon of the second user in the correspondence.

In a possible design method, the touchscreen includes an area for displaying a virtual keyboard of the text input application; and the obtaining, by the electronic device, a fingerprint of a user on a touchscreen includes: obtaining, by the electronic device, a fingerprint generated when the user performs an input event in the area of the keyboard.

According to a second aspect, an embodiment of this application provides an electronic device, including: an obtaining unit, configured to: when a text input application runs, obtain a fingerprint of a user on a touchscreen; a determining unit, configured to determine, when the fingerprint is a prestored registered fingerprint, a target lexicon associated with the fingerprint; and an execution unit, configured to provide, by using the target lexicon, at least one candidate word corresponding to a current input event.

In a possible design method, the determining unit is specifically configured to determine a personal lexicon corresponding to the fingerprint as the target lexicon based on a correspondence between a personal lexicon of a different user and a registered fingerprint of the different user.

In a possible design method, the electronic device further includes: an establishment unit, configured to: when the fingerprint is an unregistered fingerprint, establish a temporary personal lexicon corresponding to the fingerprint.

In a possible design method, the electronic device further includes a combination unit; the combination unit is configured to: when a similarity between the temporary personal lexicon and a personal lexicon of a first user is greater than a threshold, add the temporary personal lexicon to the personal lexicon of the first user; and the establishment unit is further configured to establish a correspondence between the fingerprint and the personal lexicon of the first user in the correspondence.

In a possible design method, there are N fingerprints, and N is an integer greater than 1; and the determining unit is specifically configured to: when at least one of the N fingerprints is a registered fingerprint, determine a personal lexicon corresponding to the registered fingerprint as the target lexicon based on a correspondence between a personal lexicon of a different user and a registered fingerprint of the different user.

In a possible design method, when the N fingerprints include X registered fingerprints and Y unregistered fingerprints, $X+Y=N$, $X\geq 1$, and $Y\geq 1$; and the electronic device further includes: an establishment unit, configured to establish a correspondence between the Y unregistered fingerprints and the target lexicon in the correspondence.

In a possible design method, the electronic device further includes a combination unit; the determining unit is further configured to determine, based on the correspondence, whether all of the Z registered fingerprints are corresponding to a same personal lexicon; and the combination unit is configured to: when there are different personal lexicons in personal lexicons corresponding to registered fingerprints in the Z registered fingerprints, combine personal lexicons corresponding to the Z registered fingerprints into one personal lexicon.

In a possible design method, the establishment unit is further configured to: when the N fingerprints are all unregistered fingerprints, establish a temporary personal lexicon corresponding to the N fingerprints.

In a possible design method, the combination unit is further configured to: when a similarity between the temporary personal lexicon and a personal lexicon of a second user is greater than a threshold, add the temporary personal lexicon to the personal lexicon of the second user; and the establishment unit is further configured to establish a correspondence between the fingerprints and the personal lexicon of the second user in the correspondence.

In a possible design method, the touchscreen includes an area for displaying a virtual keyboard of the text input application; and the obtaining unit is specifically configured to obtain a fingerprint generated when the user performs an input event in the area of the keyboard.

According to a third aspect, an embodiment of this application provides an electronic device, including: a processor, a memory, a bus, and a communications interface, where the memory is configured to store a computer executable instruction, the processor and the memory are connected by using the bus, and when the electronic device runs, the processor executes the computer executable instruction stored in the memory, so that the electronic device performs any foregoing touch control method.

According to a fourth aspect, an embodiment of this application further provides a computer readable storage medium, where the computer readable storage medium stores an instruction, and when the instruction is run on a computer, the computer performs the method in the foregoing aspect.

According to a fifth aspect, an embodiment of this application further provides a computer program product including an instruction, where when the computer program product runs on a computer, the computer performs the method in the foregoing aspect.

It should be understood that a description of a technical feature, a technical solution, a beneficial effect, or similar language in this application does not imply that all features and advantages can be implemented in any single embodiment. On the contrary, it may be understood that a description of a feature or a beneficial effect means that at least one embodiment includes a specific technical feature, technical solution, or beneficial effect. Therefore, in this specification, a description of a technical feature, a technical solution, or a beneficial effect may not be specific to a same embodiment. Further, technical features, technical solutions, or beneficial effects described in the embodiments may be combined in any proper manner. A person skilled in the art may understand that a specific embodiment may be implemented without using one or more specific technical features, technical solutions, or beneficial effects of the embodiment. In other embodiments, additional technical features and beneficial effects may also be identified in a specific embodiment that does not reflect all the embodiments.

DESCRIPTION OF EMBODIMENTS

The terms "first" and "second" in the following are merely intended for a purpose of description, and shall not be understood as an indication or implication of relative importance or implicit indication of a quantity of indicated technical features. Therefore, a feature restricted by "first" or "second" may explicitly indicate or implicitly include one or more such features. In the descriptions in the embodiments of this application, unless otherwise provided, "a plurality of" means two or more than two.

Currently, to enter information in various application programs (app for short below) on an electronic device, a user usually needs to install a corresponding text input app, or use a text input application originally installed on the electronic device to enter information such as a text (Chinese, English, or the like), a digit, or a symbol. In addition, the text input application may establish a personal lexicon based on an input habit of the user during input. The personal lexicon may include a user-defined word, a frequently used word, a favorite emotion, and the like, to implement relatively high input efficiency when the user uses the text input application.

Figure 1:
FIG. 1 is a schematic diagram of an input method login interface in the prior art.

However, as shown in FIG. 1, when a user wants to perform inputting by using a personal lexicon of the user, the user usually needs to enter a password to log in to an account of the user on a text input application, so that the text input application can invoke a lexicon (namely, the personal lexicon of the user) associated with the account of the user and then determine, by using the personal lexicon of the user, a candidate word that needs to be entered by the user.

In some embodiments of this application, the candidate word may specifically include at least one of a word, a term, a sentence, a phrase, a digit, a letter, a symbol, and an emotion in Chinese, or may include at least one of a word, a term, a sentence, a phrase, a digit, a letter, a symbol, and an emotion in English or another language.

When a different user performs inputting by using a same text input application of a same electronic device, the user needs to first log in to an account of the user before the electronic device provides a candidate word for an option by using a personal lexicon of the user. This undoubtedly reduces input efficiency of the input method.

Otherwise, the text input application calls a preset default lexicon to complete an input event triggered by the user. However, the default lexicon may be changed based on an input habit of a previous user during usage. Therefore, an input option that conforms to an input habit of the user cannot be obtained in a timely manner during current input of the user. Consequently, the input efficiency is reduced, and even privacy of the previous user is likely to be leaked. For example, a user A enters a phone number "123456" of the user A for a plurality of times without logging in to an account of the user A, the text input application adds the phone number of the user A to the default lexicon based on this input action, and subsequently, when a user B enters "12" without logging in to an account of the user B, the text input application may prompt the user B with the phone number "123456" of the user A as a candidate word. In this case, the phone number of the user A is leaked.

In view of this, an embodiment of this application provides an input method. The input method may be applied to any electronic device that has a fingerprint verification function such as a mobile phone, a wearable device, an AR (augmented reality)\VR (virtual reality) device, a tablet computer, a notebook computer, a UMPC (ultra-mobile personal computer), a netbook, or a PDA (personal digital assistant). Certainly, a specific form of electronic device is not limited in the following embodiments.

Specifically, a fingerprint collection device may be integrated into a touchscreen corresponding to an input interface (for example, a keyboard area) of a text input application. In this way when the electronic device starts the text input application and receives an input event in the input interface, the electronic device may obtain a fingerprint in the current input event by using the integrated fingerprint collection device. Then, the electronic device performs fingerprint verification on the obtained fingerprint. When a similarity between the obtained fingerprint and a registered fingerprint of a user A is greater than a preset threshold, it indicates that a user corresponding to the current input event is the user A. Therefore, the electronic device may log in to an account of the user A on the text input application, to invoke a personal lexicon of the user A and determine a candidate word corresponding to the current input event.

In other words, when the user uses the text input application, the electronic device may perform authentication on the user by using the fingerprint of the user that occurs when the user enters information in an input interface, to invoke, based on an authentication result, a personal lexicon corresponding to the user. In a subsequent input process, the electronic device may determine a candidate word of the current input event by using the personal lexicon.

In this way, when a different user uses the text input application on the same electronic device, the electronic device can automatically invoke, for the different user based on a fingerprint of the user without awareness of the user, a personal lexicon that conforms to an input habit of the user, to prompt a related candidate word, thereby improving input efficiency of the input method, reducing a probability of user privacy leakage caused by confusion of lexicons of different users, and improving human-machine interaction intelligence.

It should be noted that the input event may be any input action performed by the user in the input interface by using the text input application, for example, pressing a letter in a keyboard for a short time, pressing a function key of the text input application for a long time, sliding candidate words provided by the text input application, or the like.

Figure 2:
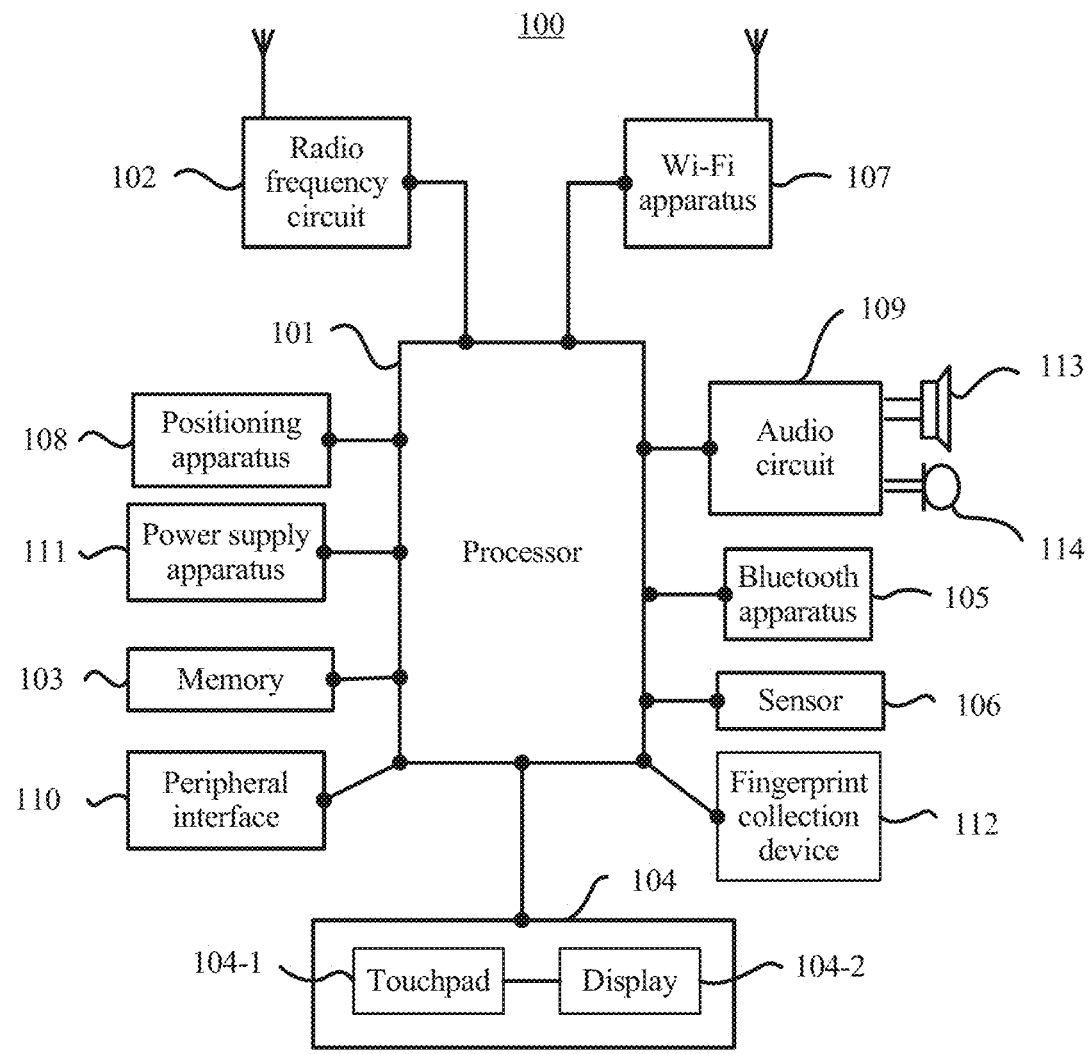
FIG. 2 is a schematic structural diagram 1 of an electronic device according to an embodiment of this application.

As shown in FIG. 2, the electronic device in this embodiment of this application may be a mobile phone 100. The following describes this embodiment in detail by using the mobile phone 100 as an example. It should be understood that the mobile phone 100 shown in the figure is merely an example of the electronic device, and the mobile phone 100 may have more or fewer components than those shown in the figure, or may combine two or more components, or may have different component configurations.

As shown in FIG. 2, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply system 111. These components may perform communication by using one or more communications buses or signal cables (not shown in FIG. 2). A person skilled in the art may understand that a hardware structure shown in FIG. 2 does not constitute a limitation on the mobile phone, and the mobile phone 100 may include more or fewer components than those shown in the figure, or may combine some components, or may have different component arrangements.

The following describes the components of the mobile phone 100 in detail with reference to FIG. 2.

The processor 101 is a control center of the mobile phone 100. The processor 101 is connected to parts of the mobile phone 100 by using various interfaces and lines, runs or executes an application program stored in the memory 103, and invokes data stored in the memory 103, to perform various functions of the mobile phone 100 and process data. In some embodiments, the processor 101 may include one or more processing units. For example, the processor 101 may be a Kirin 960 chip manufactured by Huawei Technologies Co., Ltd. In some embodiments of this application, the processor 101 may further include a fingerprint verification chip, configured to verify a collected fingerprint.

The radio frequency circuit 102 may be configured to receive and send a radio signal in an information receiving and sending process or a call process. In particular, after receiving downlink data from a base station, the radio frequency circuit 102 may send the downlink data to the processor 101 for processing. In addition, the radio frequency circuit 102 sends uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. Any communications standard or protocol may be used for the wireless communication, and includes but is not limited to a Global System for Mobile Communications, a general packet radio service, Code Division Multiple Access, Wideband Code Division Multiple Access, Long Term Evolution, an email, a short message service, and the like.

The memory 103 is configured to store an application program and data. The processor 101 runs the application program and the data stored in the memory 103, to perform various functions of the mobile phone 100 and process data. The memory 103 mainly includes a program storage area and a data storage area. The program storage area may store an operating system and an application program required by at least one function (for example, a sound playing function or an image playing function). The data storage area may store data (for example, audio data or a phone book) created based on use of the mobile phone 100. In addition, the memory 103 may include a high-speed random access memory, or may include a nonvolatile memory such as a magnetic disk storage device, a flash memory device, or another volatile solid-state storage device. The memory 103 may store various operating systems such as an iOS® operating system developed by Apple and an Android® operating system developed by Google. The memory 103 may be independent, and is connected to the processor 101 by using the communications bus. Alternatively, the memory 103 may be integrated into the processor 101.

The touchscreen 104 may include a touchpad 104-1 and a display 104-2. The touchpad 104-1 can collect a touch event performed by a user of the mobile phone 100 on or near the mobile phone 100 (for example, an operation performed by the user on the touchpad 104-1 or near the touchpad 104-1 by using any proper object such as a finger or a stylus), and send collected touch information to another component such as the processor 101. The touch event performed by the user near the touchpad 104-1 may be referred to as a floating touch. The floating touch may mean that the user does not need to directly touch the touchpad for selecting, moving, or dragging a target (for example, an icon), and the user only needs to be near the electronic device to execute a desired function. In an application scenario of the floating touch, terms such as "touch" and "contact" do not mean to directly touch the touchscreen, but to be near or close to the touchscreen. The touchpad 104-1 on which the floating touch can be performed may be implemented by using a capacitive touchpad, an infrared touchpad, and an ultrasonic touchpad. In addition, the touchpad 104-1 may be implemented in a plurality of types such as a resistive type, a capacitive type, an infrared type, and a surface acoustic wave type. The display (also referred to as a display screen) 104-2 may be configured to display information entered by the user or information provided for the user, and various menus of the mobile phone 100. The display 104-2 may be configured in a form of a liquid crystal display, an organic light emitting diode, or the like. The touchpad 104-1 may cover the display 104-2. When detecting the touch event on or near the touchpad 104-1, the touchpad 104-1 transfers the touch event to the processor 101 to determine a type of the touch event. Then, the processor 101 can provide corresponding visual output on the display 104-2 based on the type of the touch event. Although the touchpad 104-1 and the display screen 104-2 in FIG. 2 are used as two independent components to implement input and output functions of the mobile phone 100, in some embodiments, the touchpad 104-1 and the display screen 104-2 may be integrated to implement the input and output functions of the mobile phone 100. It may be understood that the touchscreen 104 is formed by stacking layers of materials. In this embodiment of this application, only the touchpad (layer) and the display screen (layer) are displayed, and another layer is not recorded in this embodiment of this application. In addition, in some other embodiments of this application, the touchpad 104-1 may cover the display 104-2, and a size of the touchpad 104-1 is greater than a size of the display screen 104-2. Therefore, the display screen 104-2 is entirely covered by the touchpad 104-1, or the touchpad 104-1 may be disposed on a front face of the mobile phone 100 in a full panel manner, in other words, the mobile phone can sense each touch performed by the user on the front face of the mobile phone 100. In this way, full touch control experience on the front face of the mobile phone can be implemented. In some other embodiments, the touchpad 104-1 is disposed on the front face of the mobile phone 100 in a full panel manner, and the display screen 104-2 may also be disposed on the front face of the mobile phone 100 in a full panel manner. In this way, a bezel-less structure can be implemented on the front face of the mobile phone.

In this embodiment of this application, the mobile phone 100 may further have a fingerprint identification function. For example, a fingerprint collection device 112 may be disposed in the touchscreen 104 to implement the fingerprint identification function. In other words, the fingerprint collection device 112 may be integrated into the touchscreen 104 to implement the fingerprint identification function of the mobile phone 100. In this case, the fingerprint collection device 112 is disposed in the touchscreen 104, and may be a part of the touchscreen 104, or may be disposed in the touchscreen 104 in another manner. In addition, the fingerprint collection device 112 may be further implemented as a full-panel fingerprint collection device. Therefore, the touchscreen 104 may be considered as a panel any position of which can be used for fingerprint identification. The fingerprint collection device 112 may send a collected fingerprint to the processor 101, so that the processor 101 performs processing (for example, fingerprint verification) on the fingerprint. A main component of the fingerprint collection device 112 in this embodiment of this application is a fingerprint sensor, and the fingerprint sensor may use any type of sensing technology. The sensing technology includes but is not limited to a sensing technology of an optical type, a capacitive type, a piezoelectric type, an ultrasonic type, or the like.

Figure 3:
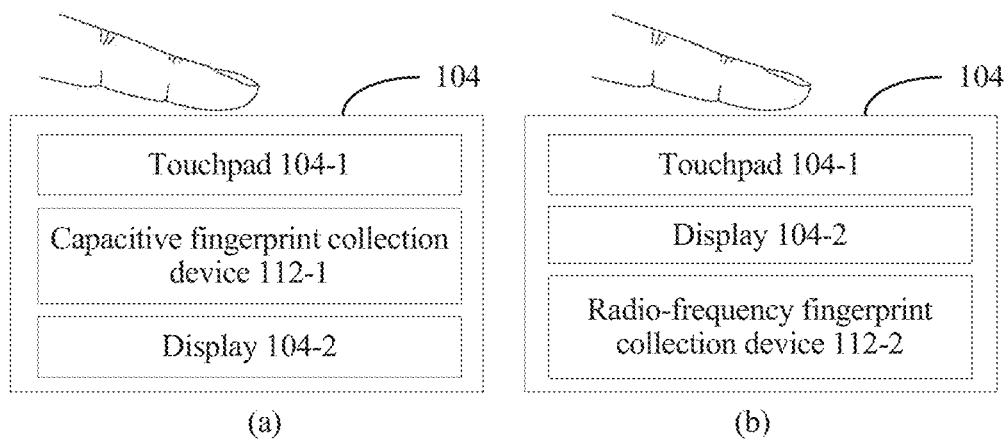
FIG. 3 is a schematic diagram of a result of a touchscreen in an electronic device according to an embodiment of this application.

In an embodiment of this application, an image (a) in FIG. 3 shows a possible design manner of the touchscreen 104, and the fingerprint collection device 112 may be a capacitive collection device 112-1. In this case, the touchscreen 104 may specifically include the capacitive fingerprint collection device 112-1, a touchpad 104-1, and a display 104-2. The display 104-2 is located at a bottom layer of the touchscreen 104. The touchpad 104-1 is located at a top layer of the touchscreen 104, and the capacitive collection device 112-1 is located between the touchpad 104-1 and the display 104-2.

In a specific implementation, a ridge position and a valley position of a fingerprint may be separately determined based on different capacitance values formed by capacitive induction particles of the capacitive collection device 112-1 with a ridge and a valley of the fingerprint, so as to obtain the fingerprint. Further, a capacitive induction particle at each pixel on a screen may be pre-charged, so that the capacitive induction particle reaches a preset threshold. When a user finger touches the touchscreen 104, because of a preset relationship between a capacitance value and a distance, different capacitance values are formed at the ridge position and the valley position, and then, discharging is performed by using a discharge current. Because the ridge and the valley are corresponding to different capacitance values, a pixel corresponding to the ridge and a pixel corresponding to the valley have different discharge speeds, where the pixel corresponding to the ridge has a lower discharge speed, and the pixel corresponding to the valley has a higher discharge speed. Therefore, the fingerprint of the user may be obtained by charging and discharging the pixel corresponding to the ridge and the pixel corresponding to the valley.

In some other embodiments of this application, an image (b) in FIG. 3 shows another possible design manner of the touchscreen 104, and the fingerprint collection device 112 may be a radio-frequency fingerprint collection device 112-2. In this case, the touchscreen 104 may include the radio-frequency fingerprint collection device 112-2, a touchpad 104-1, and a display 104-2. The radio-frequency fingerprint collection device 112-2 is located at a bottom layer of the touchscreen 104, the touchpad 104-1 is located at a top layer of the touchscreen 104, and the display 104-2 is located between the touchpad 104-1 and the radio-frequency fingerprint collection device 112-2.

In a specific implementation, when there is light shined on a surface of the touchpad 104-1 with a fingerprint, the radio-frequency fingerprint collection device 112-2 may obtain the fingerprint by absorbing reflected light by using a CCD (charge coupled device). Further, because a ridge and a valley of the fingerprint on the touchpad 104-1 have different depths and there is oil and water between a skin and the touchpad 104-1, light shined on the touchpad 104-1 at a valley position of the fingerprint is totally reflected, but light shined on the touchpad 104-1 at a ridge position of the fingerprint cannot be totally reflected, and a part of the light is absorbed by the touchpad 104-1 or diffusely reflected to another place, so that the fingerprint is formed on the CCD.

In some embodiments of this application, to reduce power consumption caused when fingerprint identification is performed on the touchscreen 104, the mobile phone 100 may power on or power off the fingerprint collection device under a specific condition. For example, when detecting a touch event performed by the user at a specific position on the touchscreen 104, the mobile phone 100 may power on the fingerprint collection device, so that the mobile phone 100 performs fingerprint identification. However, when the mobile phone 100 detects no touch event performed by the user at a specific position on the touchscreen 104, the mobile phone 100 does not power on the fingerprint collection device, in other words, the mobile phone 100 disables the fingerprint identification function. Certainly, the mobile phone 100 may further display, in a setting menu, a switch control related to the fingerprint identification, so that the user manually enables or disables the fingerprint identification function. In some other embodiments of this application, the mobile phone 100 may further enable or disable the fingerprint identification function based on a specific condition. For example, the mobile phone 100 may enable or disable the fingerprint identification function or the like based on different geographical locations.

The mobile phone 100 may further include the Bluetooth apparatus 105, configured to implement short-range data exchange between the mobile phone 100 and another electronic device (for example, a mobile phone or a smartwatch). The Bluetooth apparatus in this embodiment of this application may be an integrated circuit, a Bluetooth chip, or the like.

The mobile phone 100 may further include at least one type of sensor 106 such as a light sensor, a motion sensor, or another sensor. Specifically, the light sensor may include an ambient light sensor and a proximity sensor. The ambient light sensor may adjust luminance of the display of the touchscreen 104 based on brightness of ambient light, and the proximity sensor may turn off a power supply of the display when the mobile phone 100 moves to an ear. As a type of motion sensor, an accelerometer sensor may detect a value of an acceleration in each direction (usually, three axes), may detect a value and a direction of gravity when the sensor is stationary, and may be used in an application for identifying a mobile phone posture (such as screen switching between a landscape mode and a portrait mode, a related game, and magnetometer posture calibration), a function related to vibration identification (such as a pedometer or a knock), and the like. Other sensors such as a gyroscope, a barometer, a hygrometer, a thermometer, and an infrared sensor may be further disposed in the mobile phone 100. Details are not described herein.

The Wi-Fi apparatus 107 is configured to provide, for the mobile phone 100, network access that complies with a Wi-Fi-related standard protocol. The mobile phone 100 may access a Wi-Fi access point by using the Wi-Fi apparatus 107, to help the user receive and send an email, browse a web page, access streaming media, and the like. The Wi-Fi apparatus 107 provides wireless broadband Internet access for the user. In some other embodiments, the Wi-Fi apparatus 107 may also be used as a Wi-Fi wireless access point, and may provide Wi-Fi network access for another electronic device.

The positioning apparatus 108 is configured to provide a geographical location for the mobile phone 100. It may be understood that the positioning apparatus 108 may be specifically a receiver of a positioning system such as a Global Positioning System (GPS), a BeiDou Navigation Satellite System, or a Russian GLONASS. After receiving the geographical location sent by the positioning system, the positioning apparatus 108 sends the information to the processor 101 for processing, or sends the information to the memory 103 for storage. In some other embodiments, the positioning apparatus 108 may alternatively be a receiver of an Assisted Global Positioning System (AGPS). The AGPS system is used as an assisted server to assist the positioning apparatus 108 in completing ranging and positioning services. In this case, the assisted positioning server provides positioning assistance by communicating with the positioning apparatus 108 (namely, a GPS receiver) of the electronic device such as the mobile phone 100 by using a wireless communications network. In some other embodiments, the positioning apparatus 108 may also belong to a positioning technology based on the Wi-Fi access point. Each Wi-Fi access point has a globally unique MAC address, and the electronic device can scan and collect a broadcast signal of a surrounding Wi-Fi access point when Wi-Fi is enabled. Therefore, the electronic device can obtain a MAC address broadcast by the Wi-Fi access point. The electronic device sends such data (for example, the MAC address) that can identify the Wi-Fi access point to a location server by using the wireless communications network. The location server retrieves a geographical location of each Wi-Fi access point, calculates a geographical location of the electronic device with reference to strength of the Wi-Fi broadcast signal, and sends the geographical location of the electronic device to the positioning apparatus 108 of the electronic device.

The audio circuit 109, a loudspeaker 113, and a microphone 114 may provide audio interfaces between the user and the mobile phone 100. The audio circuit 109 may convert received audio data into an electrical signal and transmit the electrical signal to the loudspeaker 113, and the loudspeaker 113 converts the electrical signal into a sound signal and outputs the sound signal. In addition, the microphone 114 converts the collected sound signal into an electrical signal, and the audio circuit 109 receives the electrical signal and converts the electrical signal into audio data, and outputs the audio data to the RF circuit 102 to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identity module card). For example, the electronic device is connected to a mouse by using a universal serial bus (USB) interface, and the electronic device is connected, by using a metal contact on a card slot of the subscriber identity module card, to a subscriber identity module (SIM) card provided by a telecommunications operator. The peripheral interface 110 may be configured to couple the external input/output peripheral device to the processor 101 and the memory 103.

The mobile phone 100 may further include the power supply apparatus 111 (for example, a battery or a power supply management chip) that supplies power to the components. The battery may be logically connected to the processor 101 by using the power supply management chip, so that functions such as charging management, discharging management, and power consumption management are implemented by using the power supply apparatus 111.

Although not shown in FIG. 2, the mobile phone 100 may further include a camera (a front-facing camera and/or a rear-facing camera), a camera flash, a micro projection apparatus, a near field communication (NFC) apparatus, and the like. Details are not described herein.

Figure 4:
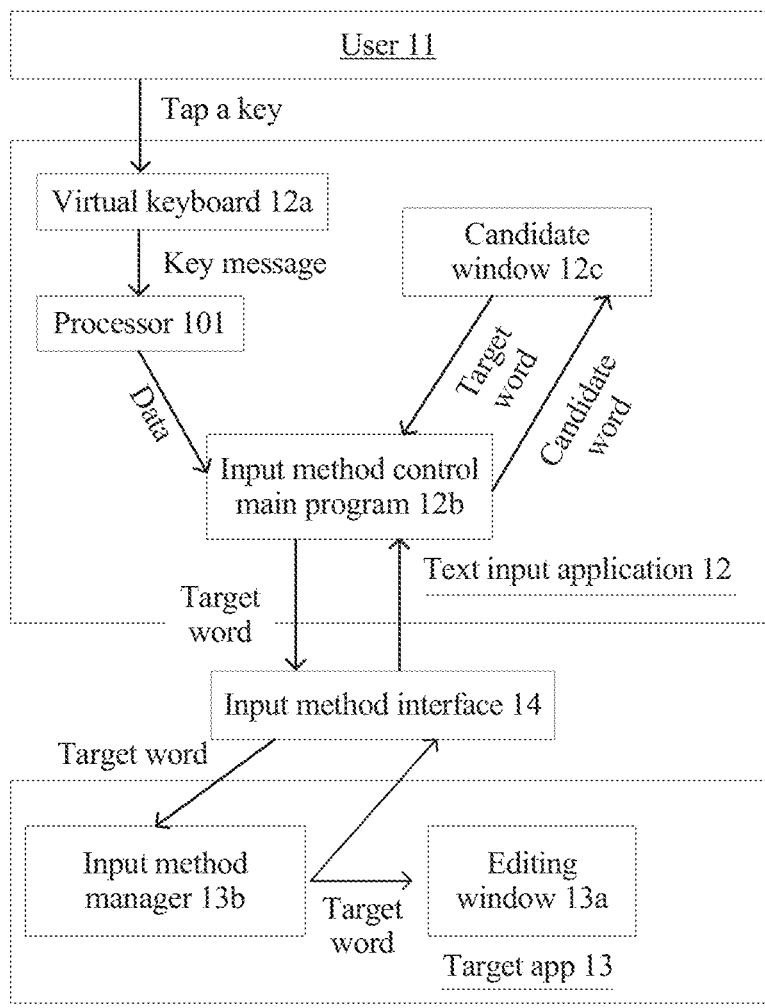
FIG. 4 is a schematic architectural diagram 1 of an input method according to an embodiment of this application.

In this embodiment of this application, the memory 103 in the mobile phone 100 stores the text input application, and when the user uses the input method to enter information to an app that needs to use the text input application, three levels: the user, the input method, and a system are usually related. An Android operating system is used as an example. As shown in FIG. 4, an Android platform input method framework usually includes three parts: a user 11, a text input application 12, and an app 13.

In a possible design method, as shown in FIG. 4, if the app 13 detects, in a running process, that an editing window 13a of the app 13 receives a tap operation of the user, the app 13 invokes an input method interface 14. In this case, the text input application 12 may display, on the touchscreen, a graphical user interface related to the input method such as a virtual keyboard 12a. Therefore, after the electronic device detects an input event (for example, a tap on a key in the virtual keyboard 12a) on the virtual keyboard 12a, the processor 101 may obtain the input event, and send data corresponding to the input event such as a letter or a symbol to an input method control main program 12b. The input method control main program 12b may invoke the lexicon (for example, the personal lexicon of the user) to determine a candidate word corresponding to the input event, and display the candidate word in a candidate window 12c. When it is detected that the user selects a target word from the candidate word, the input method control main program 12b sends the target word to an input method manager 13b (for example, an input method manager class) of the app 13 by using the input method interface 14. In this way, the input method manager 13b may input, to the current editing window 13a, the target word selected by the user, to complete the current input event.

Figure 5:
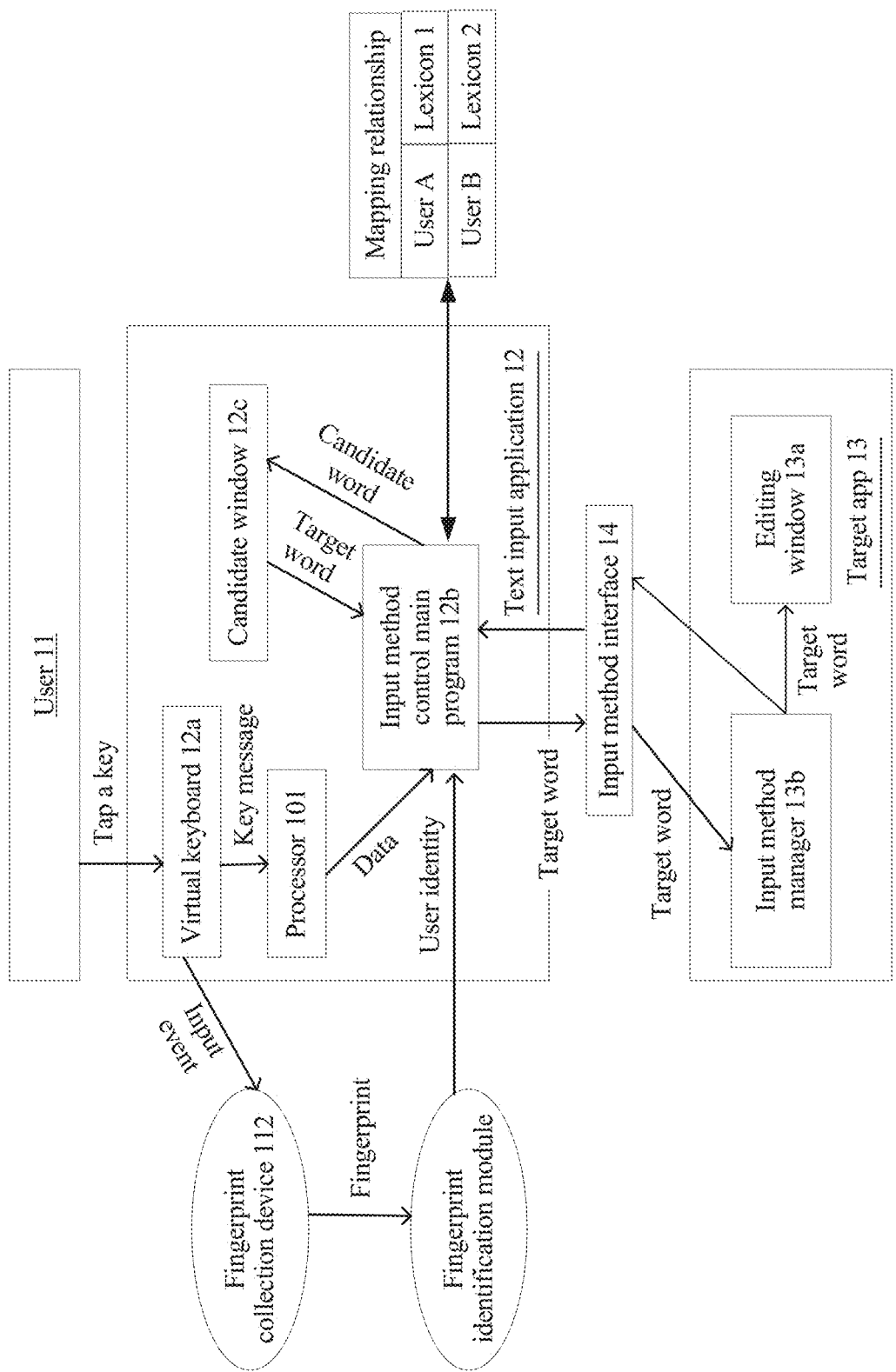
FIG. 5 is a schematic architectural diagram 2 of an input method according to an embodiment of this application.

In another possible design method, before the input method control main program 12b invokes the lexicon, as shown in FIG. 5, after the user triggers an input event on the virtual keyboard 12a, the text input application 12 may first invoke the fingerprint collection device 112 to collect a fingerprint in the input event, and then send the fingerprint to a fingerprint identification module 15. The fingerprint identification module 15 identifies an identity of the current user based on the fingerprint. As shown in FIG. 5, the input method control main program 12b may further invoke, based on a correspondence between a different user and a different personal lexicon, a personal lexicon (namely, a target lexicon) corresponding to the current user. Subsequently, similar to an input procedure shown in FIG. 4, the input method control main program 12b may determine a candidate word for the current input event by using the target lexicon.

Figure 6:
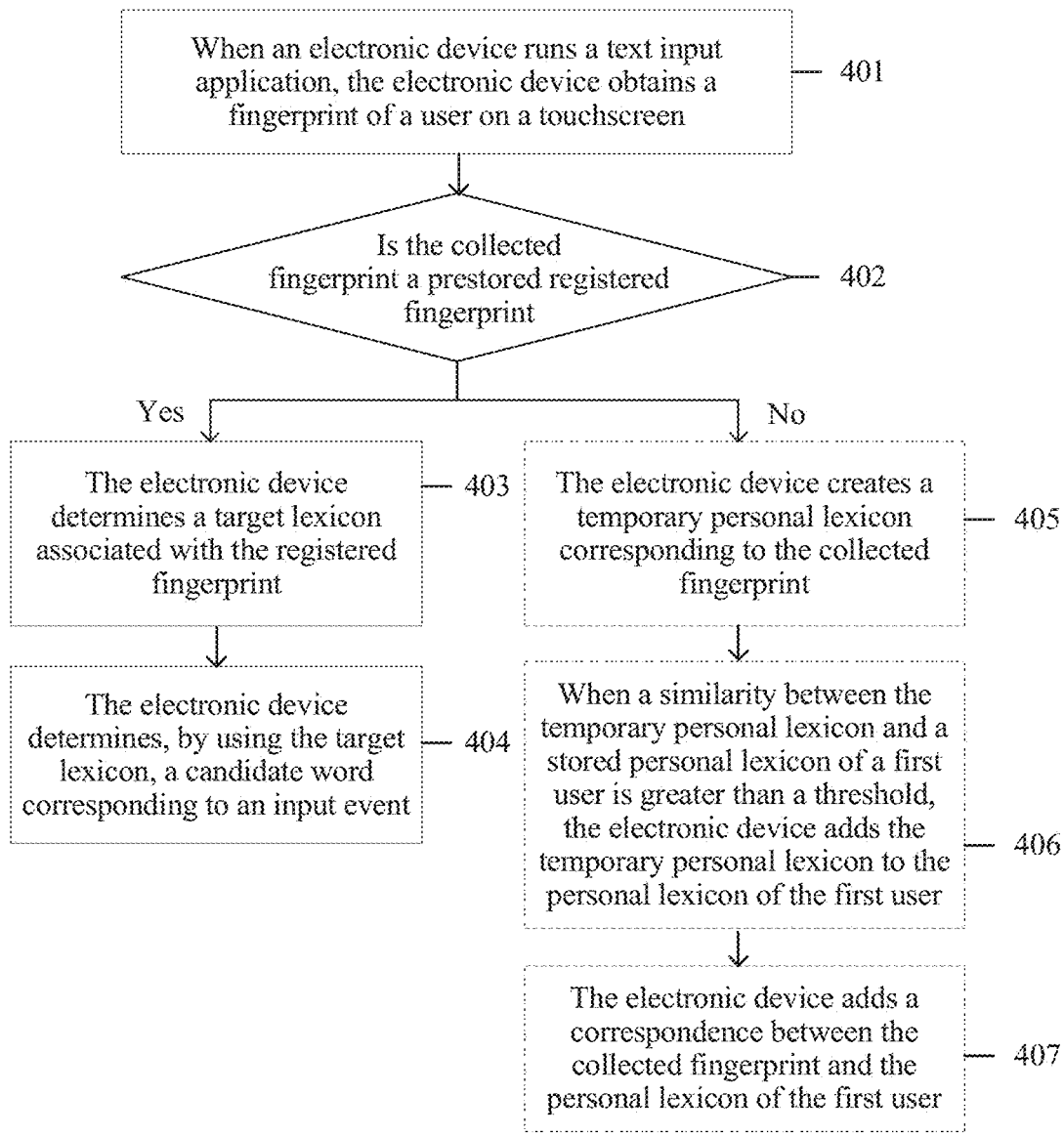
FIG. 6 is a schematic flowchart 1 of an input method according to an embodiment of this application.

The following describes an input method according to an embodiment of this application in detail with reference to a specific embodiment. As shown in FIG. 6, the method includes the following steps.

401. When an electronic device runs a text input application, the electronic device obtains a fingerprint of a user on a touchscreen.

Figure 7:
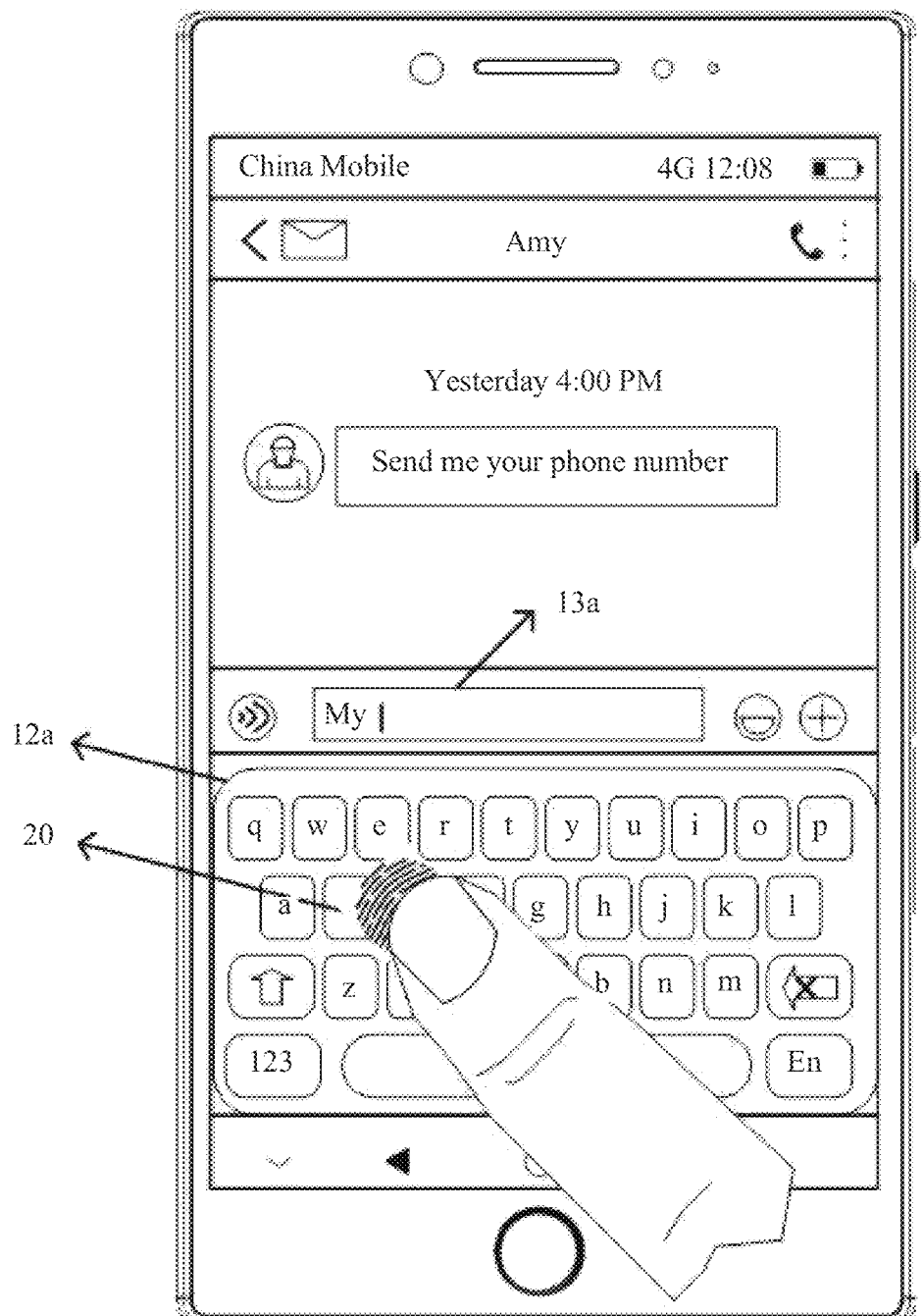
FIG. 7 is a schematic diagram 1 of an application scenario of an input method according to an embodiment of this application.

For example, as shown in FIG. 7, an app in which information currently needs to be entered is a short message application, and an editing window 13a is displayed in a short message interface shown in FIG. 7, and may be used to display a short message being edited by the user. When the electronic device detects that a user finger taps the editing window 13a, the short message app invokes an API (application programming interface) of the text input application, and triggers the input method to display a virtual keyboard 12a on the touchscreen, so that the text input application is invoked to run in a foreground.

When the text input application runs in the foreground, the electronic device may detect a tap operation of the user finger on a related virtual key of the virtual keyboard 12a. In this case, because a fingerprint collection device (not shown in FIG. 7) is integrated into the touchscreen, the electronic device may collect, by using the fingerprint collection device, a fingerprint 20 formed by the user on the touchscreen. In this embodiment of this application, for example, the fingerprint collection device may be disposed in an area that is on the touchscreen and that is corresponding to the virtual keyboard 12a. In this way, the electronic device may determine an identity of the user based on the collected fingerprint 20, to invoke, without awareness of the user, a personal lexicon associated with the user, thereby simplifying a login process of the text input application and improving input efficiency.

It should be noted that in the accompanying drawing in this embodiment of this application, the collected fingerprint 20 is displayed on the touchscreen of the electronic device only for an illustration purpose. It may be understood that when the fingerprint of the user is collected, the touchscreen may not display a related pattern of the collected fingerprint.

Certainly, the fingerprint collection device may alternatively be disposed in an area outside the virtual keyboard 12a. In this way, when the user touches a display screen in the area outside the virtual keyboard 12a, the electronic device may also obtain a fingerprint 12 of the user. A position for obtaining the fingerprint of the user is not limited in this embodiment of this application.

Alternatively, when the text input application runs in a background, the electronic device may obtain the fingerprint of the user on the touchscreen by using the fingerprint collection device. In this case, the electronic device may alternatively determine, based on the collected fingerprint, the personal lexicon associated with the current user. Therefore, once the electronic device invokes the text input application to run in the foreground, the determined personal lexicon may be used in a timely manner, thereby improving input efficiency.

In some other embodiments of this application, to reduce power consumption caused when fingerprint identification is performed on the touchscreen, the electronic device may be set to power on the fingerprint collection device under a specific condition, or power off the fingerprint collection device under a specific condition or reduce a scanning frequency of the fingerprint collection device under a specific condition. For example, after a graphical user interface (for example, the virtual keyboard 12a) related to the text input application is displayed on the touchscreen, the text input application may further collect, by using the fingerprint collection device integrated into the touchscreen, a fingerprint generated when the user touches the virtual keyboard 12a.

In addition, one fingerprint is used as an example for description in FIG. 7. However, it may be understood that one or more fingerprints may be collected in step 401.

402. The electronic device performs fingerprint verification based on the collected fingerprint.

For example, the collected fingerprint 20 may be compared with a prestored registered fingerprint, to determine whether the collected fingerprint 20 is a registered fingerprint. For another example, the electronic device may send the collected fingerprint 20 to a server on a network side by using a wireless network, and the server performs fingerprint verification, and returns a verification result to the electronic device by using the wireless network.

A memory 103 of the electronic device prestores one or more registered fingerprints. For example, the registered fingerprint may be a fingerprint used to unlock a screen of the electronic device, or may be a fingerprint used to log in to the text input application.

In step 402, the electronic device compares the collected fingerprint 20 with a registered fingerprint. In other words, the electronic device performs fingerprint identification on the collected fingerprint 20. When a similarity between the collected fingerprint 20 and a registered fingerprint is greater than a preset threshold, the fingerprint 20 may be determined as a registered fingerprint. In this case, the electronic device may continue to perform the following steps 403 and 404:

403. The electronic device determines, when the collected fingerprint is a registered fingerprint, a target lexicon associated with the registered fingerprint.

404. The electronic device determines, by using the target lexicon, a candidate word corresponding to an input event, and displays the candidate word.

Specifically, after determining a correspondence between a registered fingerprint of a different user and a personal lexicon of the different user, the electronic device may use a personal lexicon corresponding to the collected fingerprint as the target lexicon based on the correspondence. For example, as shown in Table 1, a user A (Tom) registers a fingerprint 1 and a fingerprint 2 with the text input application, and a personal lexicon of Tom is a lexicon 1. Similarly, a user B (Alice) registers a fingerprint 3 and a fingerprint 4 with the text input application, and a personal lexicon of Alice is a lexicon 2. It may be understood that serial numbers of the fingerprint 1 to the fingerprint 4 in Table 1 and serial numbers of different fingerprints in subsequent Table 2 are only used to distinguish between different fingerprints of different users, and are intended to limit specific fingers corresponding to the fingerprints. In addition, Table 1 shows only an example of a correspondence between a registered fingerprint and a personal lexicon of a user. It may be understood that the correspondence may be shown in another form other than a table.

TABLE 1

| Registered fingerprint | | Personal lexicon |
| --- | --- | --- |
| User A (Tom) | Fingerprint 1 Fingerprint 2 | Lexicon 1 |
| User B (Alice) | Fingerprint 3 Fingerprint 4 | Lexicon 2 |

When the collected fingerprint 20 is the fingerprint 1 in Table 1, the electronic device may determine, by using Table 1, that the target lexicon associated with the registered fingerprint (namely, the fingerprint 1) is the lexicon 1, namely, the personal lexicon of Tom.

Figure 8:
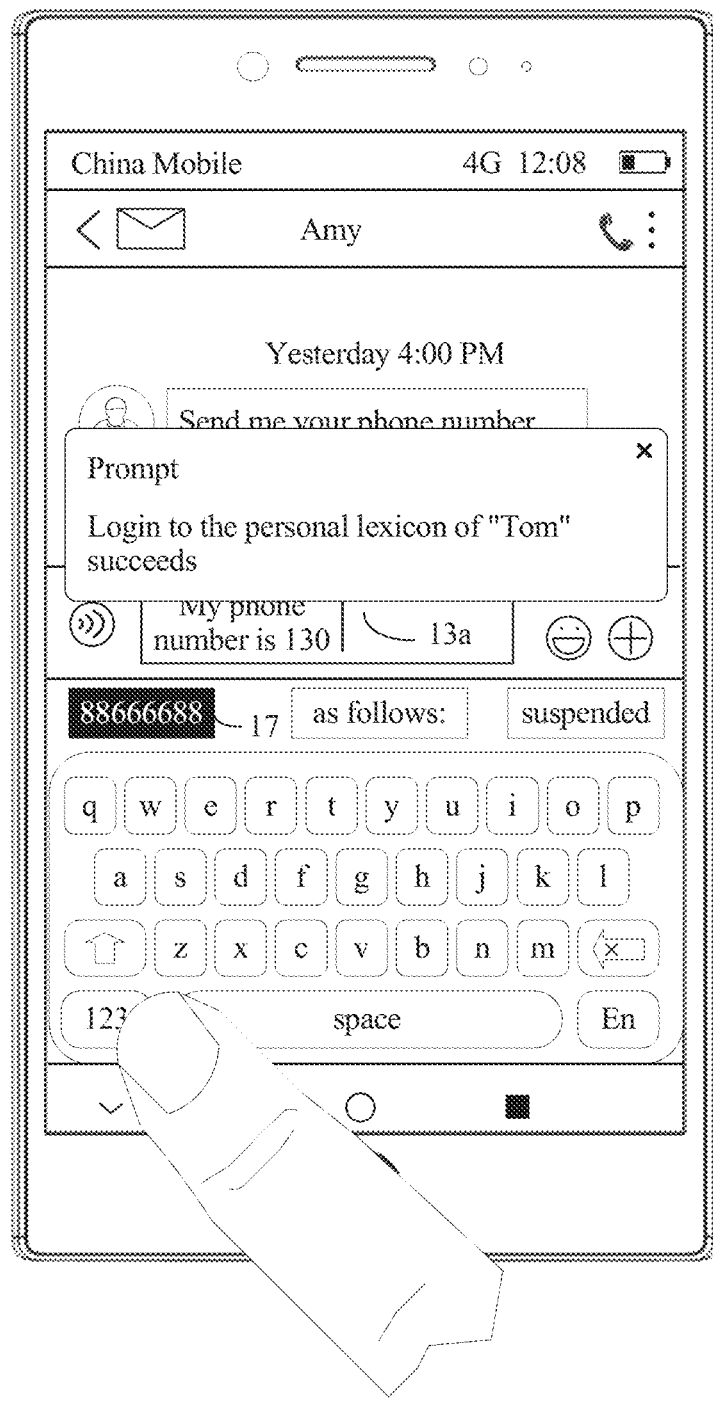
FIG. 8 is a schematic diagram 2 of an application scenario of an input method according to an embodiment of this application.

In this case, as shown in FIG. 8, the electronic device may log in to the personal lexicon of Tom, and determine, by using the personal lexicon of Tom, a candidate word corresponding to a current input event. As shown in FIG. 8, the user enters "Wo de diad hua shi 130 (in Chinese Pinyin, which means that my phone number is 130)" in the editing window 13a, and because the personal lexicon of Tom records a phone number "13088666688" of Tom, the text input application can prompt the last eight numbers "88666688" in the phone number of Tom from the personal lexicon of Tom as a first candidate word 17. Similarly if the user enters "My phone number is 130" in English in the editing window 13a, the text input application can prompt the last eight numbers "88666688" in the phone number of Tom from the personal lexicon of Tom as a first candidate word 17. In this way, Tom may select the first candidate word 17 to enter the phone number to the editing window 13a, and does not need to manually enter the phone number one by one, thereby improving input efficiency of the input method.

In some other embodiments of this application, after the electronic device logs in to an account of Tom, the electronic device may continuously enrich and improve the personal lexicon of Tom in a subsequent input process based on an input habit of Tom. For example, a server of the text input application may establish a lexicon on the server in manners such as entry source collection, filtering and deduplication, machine sorting (for example, deletion of a wrong and inappropriate character and a junk word), collection of statistics about word frequency, new word discovery, and lexicon verification (for example, word appearance sequence adjustment). The lexicon may be updated in real time. Further, the electronic device may establish the personal lexicon of the user in the lexicon based on an input habit (for example, a spelling habit, a frequently used word, or a writing style) of using the text input application by the user, and store the personal lexicon of the user in the electronic device of the user. The personal lexicon may be updated through periodic network connection.

In some other embodiments of this application, to reduce power consumption caused when fingerprint identification is performed on the touchscreen, the electronic device may power off the fingerprint collection device or reduce a scanning frequency of the fingerprint collection device when the personal lexicon of Tom is logged in or a graphical user interface (for example, the virtual keyboard) that is related to the text input application and that is shown in the touchscreen is hidden.

It can be learned that the electronic device may automatically log, by using the fingerprint formed on the touchscreen by the user in an input process, in to the personal lexicon of the user without awareness of the user. In other words, the user can invoke the personal lexicon of the user without a need to manually log in to the account of the user on the text input application, to achieve, for the user, perception-free and seamless experience of user identity identification and user account switching in the input method, thereby improving intelligence, interactivity, and input efficiency of the input method.

Figure 9:
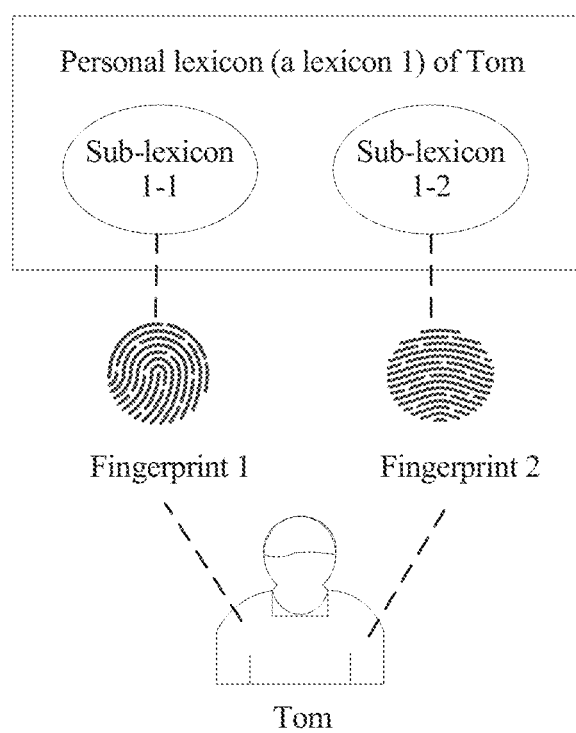
FIG. 9 is a schematic diagram 3 of an application scenario of an input method according to an embodiment of this application.

In some other embodiments of this application, still as shown in Table 1, each user may register two or more fingerprints. Therefore, for a user (for example, Tom), the personal lexicon of Tom may be divided into different sub-lexicons based on different registered fingerprints. As shown in FIG. 9, the electronic device may establish a sub-lexicon 1-1 based on an input habit for a fingerprint 1, and establish a sub-lexicon 1-2 based on an input habit for a fingerprint 2.

In this way, when the user performs inputting on the virtual keyboard 12a of the text input application by using a finger 1, the electronic device collects a fingerprint of the finger 1 and performs fingerprint verification on the collected fingerprint. When determining that the collected fingerprint is the fingerprint 1, the electronic device may invoke the sub-lexicon 1-1 associated with the fingerprint 1, determine a candidate word for current input based on the sub-lexicon 1-1, and display the candidate word on the touchscreen. When the user performs inputting on the virtual keyboard 12a of the text input application by using a finger 2, the electronic device collects a fingerprint of the finger 2 and performs fingerprint verification on the collected fingerprint. When the electronic device determines that the collected fingerprint is the fingerprint 2, the electronic device may determine a candidate word for current input based on the sub-lexicon 1-2, and display the candidate word on the touchscreen.

Certainly, if the user simultaneously performs inputting on the virtual keyboard 12a of the text input application by using the finger 1 and the finger 2, the electronic device may display, in different forms in a current display interface, candidate words separately determined from the sub-lexicon 1-1 and the sub-lexicon 1-2. For example, the candidate word determined from the sub-lexicon 1-1 is marked red and displayed in a candidate window, and the candidate word determined from the sub-lexicon 1-2 is marked black and displayed in the candidate window. In this way, the user can intuitively see different candidate words corresponding to different fingers, thereby improving user experience.

Figure 10:
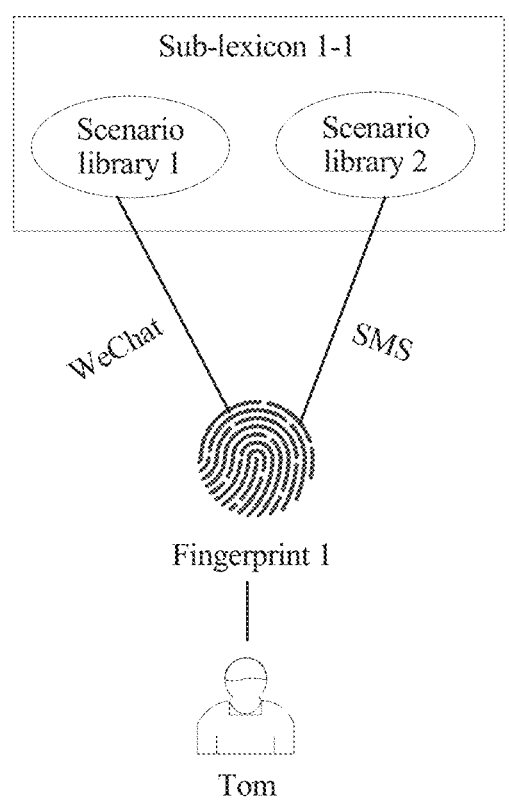
FIG. 10 is a schematic diagram 4 of an application scenario of an input method according to an embodiment of this application.

In some other embodiments of this application, for different registered fingerprints of the user, the electronic device may further divide the sub-lexicon into scenario libraries associated with different application scenarios. For example, as shown in FIG. 10, the sub-lexicon 1-1 may be divided into a scenario library 1 and a scenario library 2. The scenario library 1 may be set based on an input habit of using the fingerprint 1 by the user on a WeChat application, and the scenario library 2 may be set based on an input habit of using the fingerprint 1 by the user on a short message application. Therefore, after determining that the fingerprint in the current input event is the fingerprint 1, the electronic device may further determine a candidate word of a current input event by invoking a corresponding scenario library based on a specific application running in the foreground, to meet an input need of the user in a different application scenario, thereby further improving user experience.

For example, when the text input application runs in the foreground, the electronic device collects a fingerprint of a user finger. When the collected fingerprint is consistent with the fingerprint 1, if an app that currently runs in the foreground is the short message application, as shown in FIG. 11a, the electronic device may invoke the scenario library 2 in the sub-lexicon 1 based on the fingerprint 1 and the current short message application, and then determine a candidate word for "My name is" in the editing window 13a by using the scenario library 2.

Because the user usually enters the real name "Tom" of the user when using the short message application in the past, the electronic device may record "Tom" as a frequently used word in the scenario library 2. Therefore, when detecting that "My name is" is entered in the editing window 13a, the electronic device may display, in a candidate window 12c by invoking the scenario library 2, one or more frequently used words associated with "name". For example, as shown in FIG. 11a, the electronic device provides and displays "Tom" as the first candidate word 17 in the candidate window 12c.

Figure 11B:
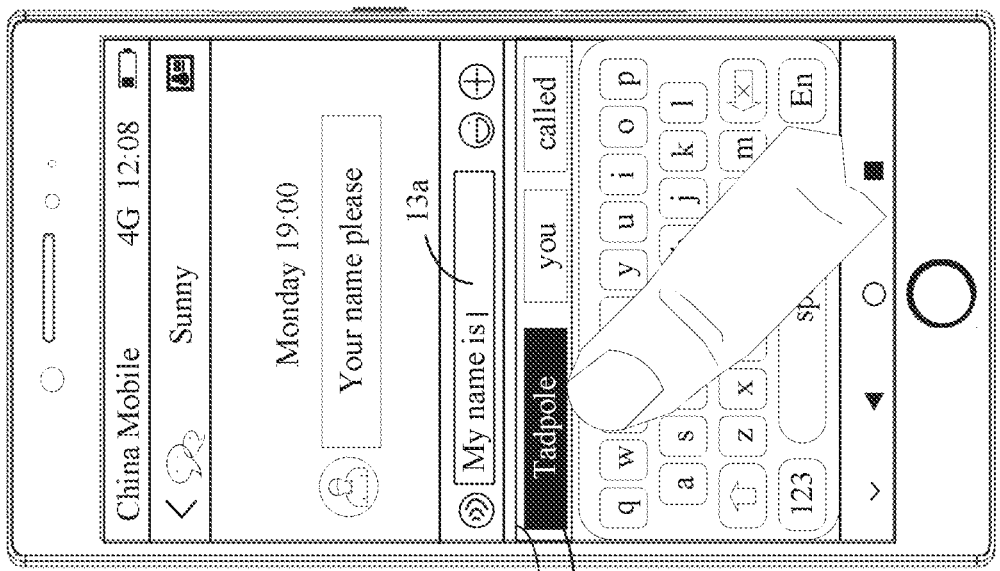
FIG. 11a and FIG. 11b are a schematic diagram 5 of an application scenario of an input method according to an embodiment of this application.
Figure 11A:
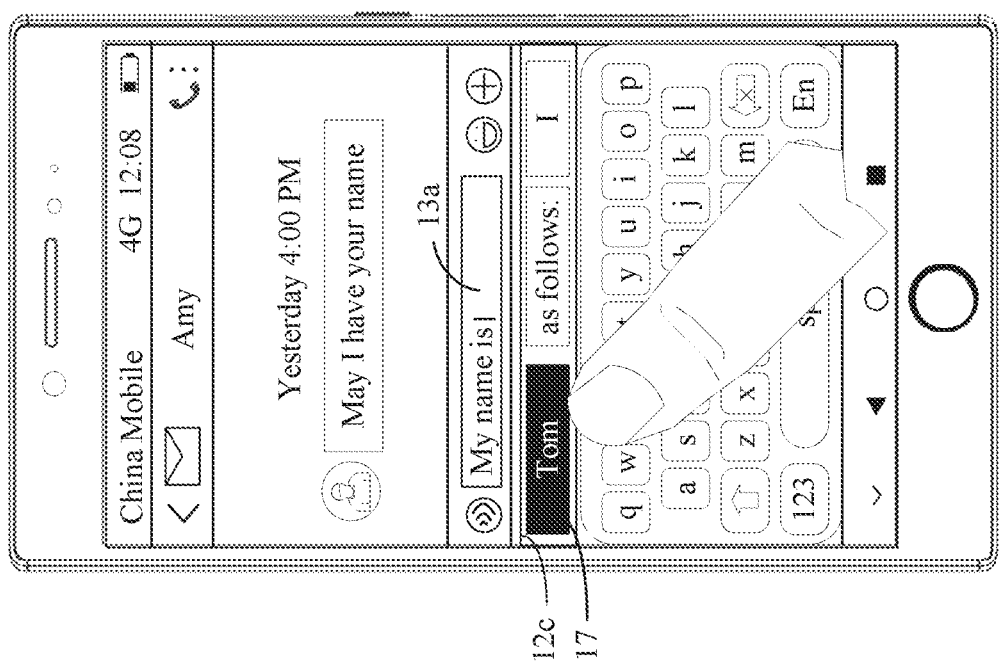

Correspondingly, if an app that currently runs in the foreground is the WeChat application, as shown in FIG. 11b, the electronic device may invoke the scenario library 1 in the sub-lexicon 1, and determine a candidate word for "My name is" in the editing window 13a by using the scenario library 1.

Because the user usually enters a nickname "Little Tadpole" of the user when using the WeChat application in the past, the electronic device may record "Little Tadpole" as a frequently used word in the scenario library 1. When detecting that "My name is" is entered in the editing window 13a, the electronic device may display, in a candidate window 12c by invoking the scenario library 1, one or more frequently used words associated with "name". For example, as shown in FIG. 11b, the electronic device displays "Little Tadpole" as the first candidate word 17 in the candidate window 12c. In this way, the electronic device may determine a candidate word of a current input event by invoking a corresponding scenario library based on a specific application running in the foreground, to meet an input need of the user in a different application scenario, thereby improving input efficiency.

In some other embodiments of this application, after step 402 is performed, if the fingerprint obtained in step 401 is not a registered fingerprint (in other words, the obtained fingerprint is an unregistered fingerprint), the input method may further include the following steps 405 to 407.

405. The electronic device creates a temporary personal lexicon corresponding to the collected fingerprint.

Specifically, when the collected fingerprint 20 is an unregistered fingerprint, it indicates that the fingerprint of the finger used by the current user to perform an operation is not registered with the electronic device. Therefore, an identity of the current user and a personal lexicon corresponding to the current user cannot be determined.

Therefore, in step 405, the electronic device may consider, as a new user that is not registered with the electronic device, a user that currently operates the text input application, for example, a user C in Table 2. Further, the electronic device may learn an input habit of the current user (namely, the user C) based on a default lexicon, for example, a frequently used word entered by the user or a writing style of the user, to create a new personal lexicon corresponding to a fingerprint 5 of the user C, namely, a temporary personal lexicon. In this case, as shown in Table 2, there is a correspondence between the fingerprint 5 of the user C and the temporary personal lexicon.

TABLE 2

| Registered fingerprint | | Personal lexicon |
|---|---|---|
| User A (Tom) | Fingerprint 1 Fingerprint 2 | Lexicon 1 |
| User B (Alice) | Fingerprint 3 Fingerprint 4 | Lexicon 2 |
| Unregistered fingerprint | | Personal lexicon |
| User C | Fingerprint 5 | Temporary personal lexicon |

Figure 12:
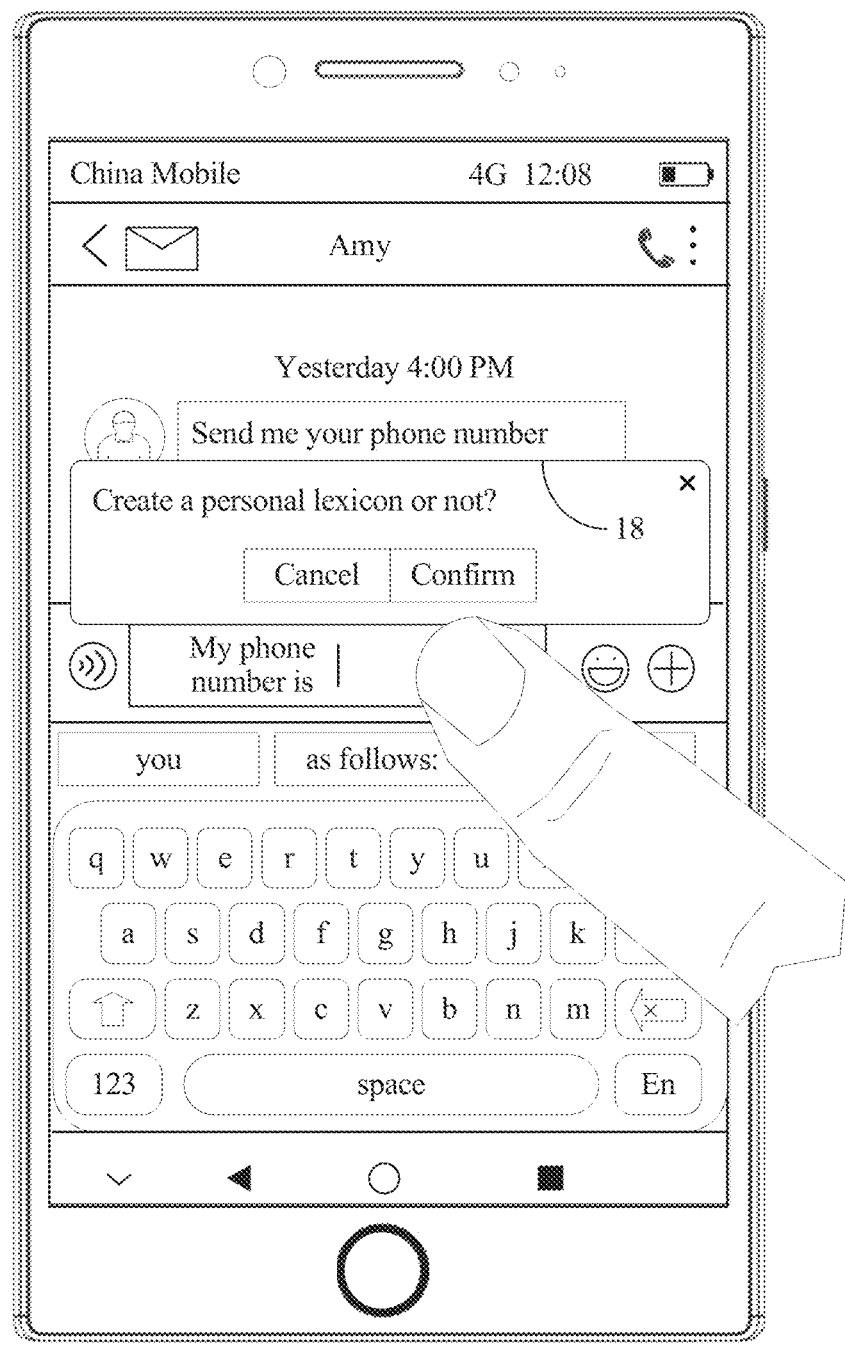
FIG. 12 is a schematic diagram 6 of an application scenario of an input method according to an embodiment of this application.

In an embodiment of this application, as shown in FIG. 12, when the collected fingerprint 20 is an unregistered fingerprint, the electronic device may prompt, by using a prompt box 18, the user to determine whether to create a personal lexicon that belongs to the user. After the user determines to create the personal lexicon, subsequently, each time a user input event with the fingerprint 20 is received, the electronic device learns the input habit of the user based on the default lexicon, and after a period of time, the electronic device may obtain a temporary personal lexicon that belongs to the user.

406. When a similarity between the temporary personal lexicon and a stored personal lexicon of a first user is greater than or equal to a preset threshold, the electronic device adds the temporary personal lexicon to the personal lexicon of the first user.

Because the user may register only one fingerprint or a few fingerprints with the electronic device, when the collected fingerprint 20 is an unregistered fingerprint, it cannot be determined that the user with the fingerprint 20 does not have a corresponding personal lexicon in the electronic device.

Therefore, the electronic device may periodically or non-periodically compare the temporary personal lexicon created in step 405 with a stored personal lexicon of each user in Table 1. When the similarity between the temporary personal lexicon and the stored personal lexicon of the first user (for example, Tom) is greater than the threshold, it indicates that the input habit of the user with the fingerprint 20 in step 401 is very similar to the input habit of Tom. Therefore, the user with the fingerprint 20 may be considered as Tom. In this case, the electronic device may log in to the personal lexicon of Tom, and add the temporary personal lexicon to the personal lexicon of Tom, to complete update of the personal lexicon of Tom.

Figure 13:
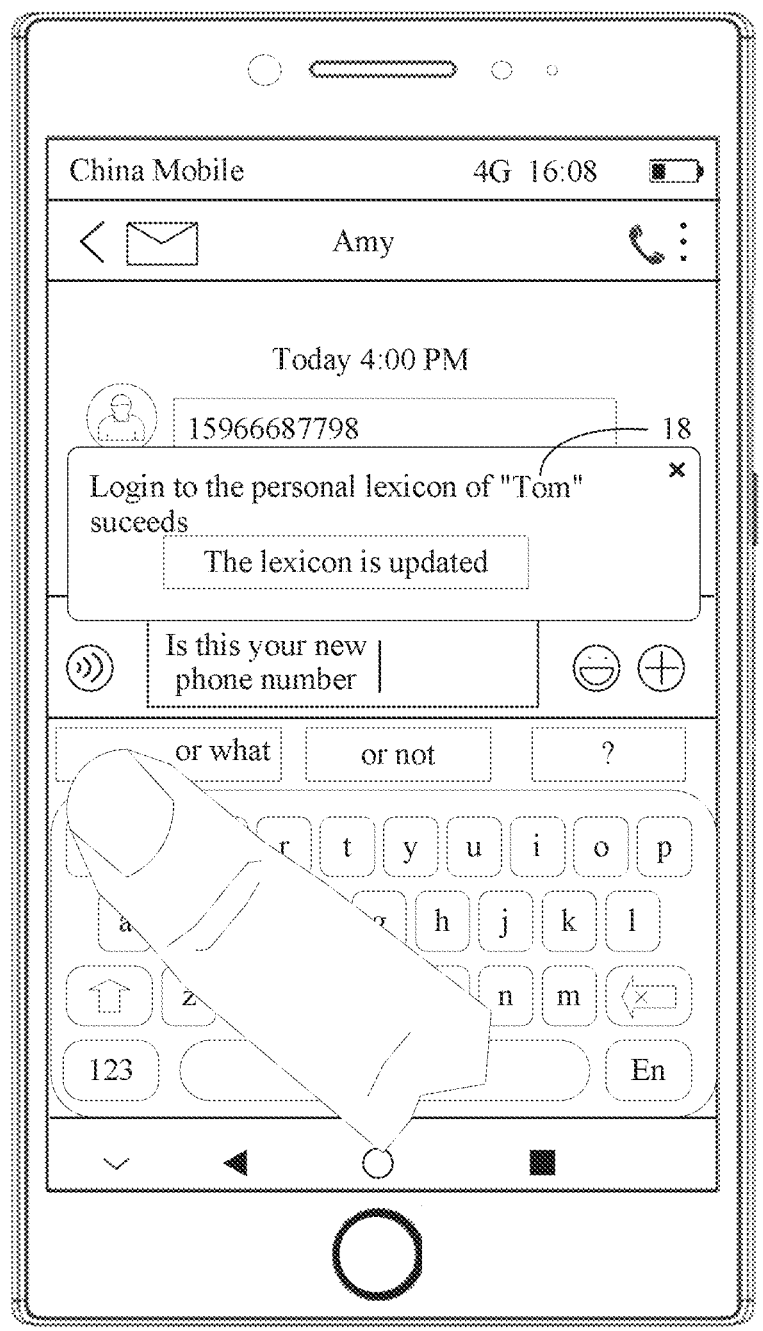
FIG. 13 is a schematic diagram 7 of an application scenario of an input method according to an embodiment of this application.

In an embodiment of this application, as shown in FIG. 13, the electronic device may inform the user that the personal lexicon of Tom is logged in and the personal lexicon of Tom is updated, and subsequently, the electronic device determines, by using the personal lexicon of Tom, a candidate word of an input event triggered by the user.

In addition, the electronic device may determine a similarity between two lexicons based on data recorded in lexicons such as spelling habits, frequently used words, and writing styles of users. For example, when 85% of frequently used words recorded in the lexicon 1 and frequently used words recorded in the lexicon 2 are the same, the user using the lexicon 1 and the user using the lexicon 2 may be considered as a same user.

Certainly, a person skilled in the art may further specifically set, based on actual experience or an actual application scenario, the threshold and a method for determining a similarity between two lexicons. The method for determining a similarity between two lexicons is not limited in this embodiment of this application.

407. The electronic device establishes a correspondence between the collected fingerprint and the personal lexicon of the first user.

After the electronic device adds the temporary personal lexicon to the personal lexicon of the first user, the electronic device may update the correspondence between a registered fingerprint and a personal lexicon shown in Table 2, so that the electronic device can accurately invoke a corresponding target lexicon based on an updated correspondence when subsequently receiving a new input event.

For example, as shown in Table 3, the electronic device may update the correspondence between a registered fingerprint and a personal lexicon shown in Table 1 with the correspondence between the fingerprint 5 (namely, the collected fingerprint 20) and the lexicon 1.

TABLE 3

| Registered fingerprint | | Personal lexicon |
|---|---|---|
| User A (Thin) | Fingerprint 1 Fingerprint 2 Fingerprint 5 | Lexicon 1 |
| User B (Alice) | Fingerprint 3 Fingerprint 4 | Lexicon 2 |

Figure 14:
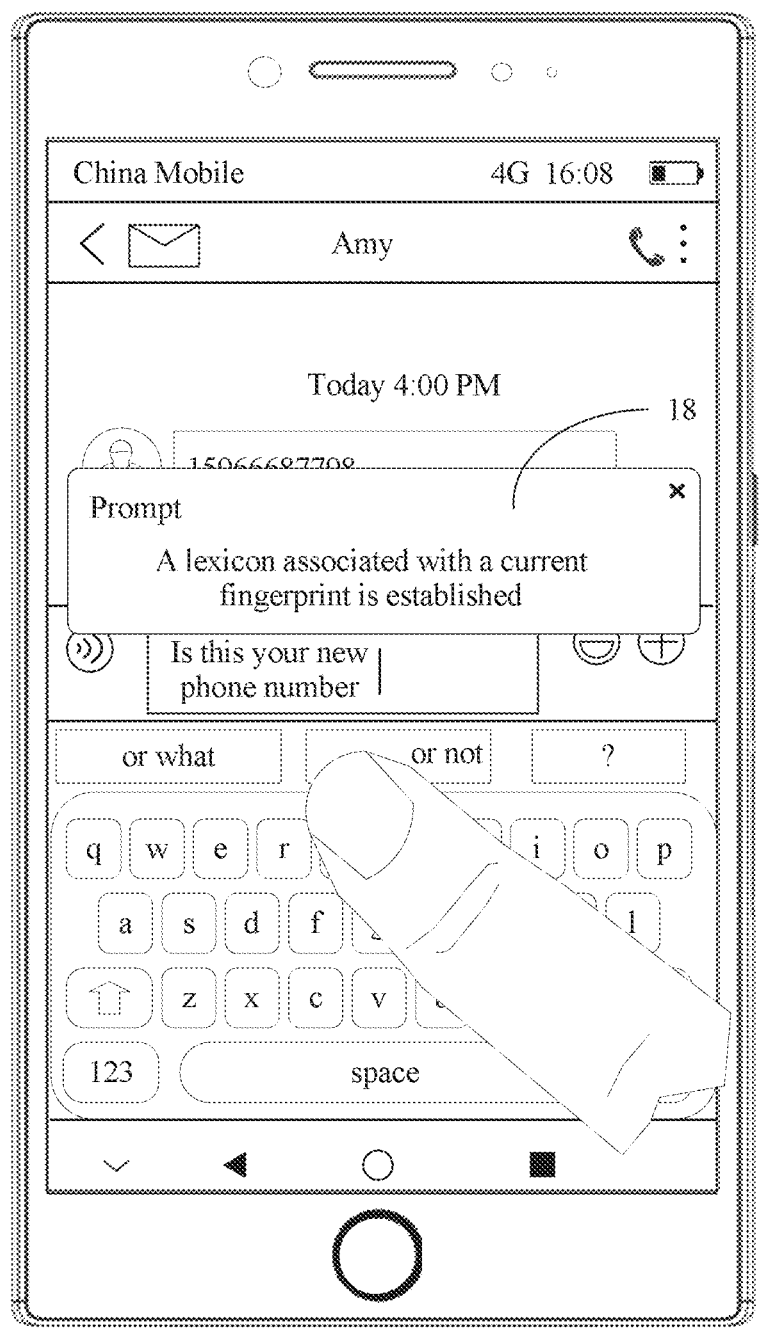
FIG. 14 is a schematic diagram 8 of an application scenario of an input method according to an embodiment of this application.

In an embodiment of this application, as shown in FIG. 14, the electronic device may further inform, in a display interface, the user that a lexicon associated with the current fingerprint (namely, the collected fingerprint 20) is established, for example, the lexicon 1, so that the user learns that the user can subsequently log in to the personal lexicon of the user by using the collected fingerprint 20.

In this way, different lexicons corresponding to a same user can be identified by determining a similarity between lexicons corresponding to different fingerprints. Therefore, after different lexicons corresponding to a same user are combined, a personal lexicon of the user can be enriched and optimized, and accuracy of subsequently using the text input application by the user can be improved.

In some other embodiments of this application, when a similarity between the temporary personal lexicon and a stored personal lexicon of each user is less than the threshold, it indicates that the user C corresponding to the temporary personal lexicon is actually a newly added user, and the electronic device may continue to enrich and complete the temporary personal lexicon based on an input habit of the user C. In this way, when the user C subsequently performs an input event on the text input application by using a same fingerprint again, the electronic device may determine a candidate word corresponding to the input event by invoking the temporary personal lexicon based on the correspondence between the fingerprint 5 of the user C and the temporary personal lexicon shown in Table 2.

Figure 15:
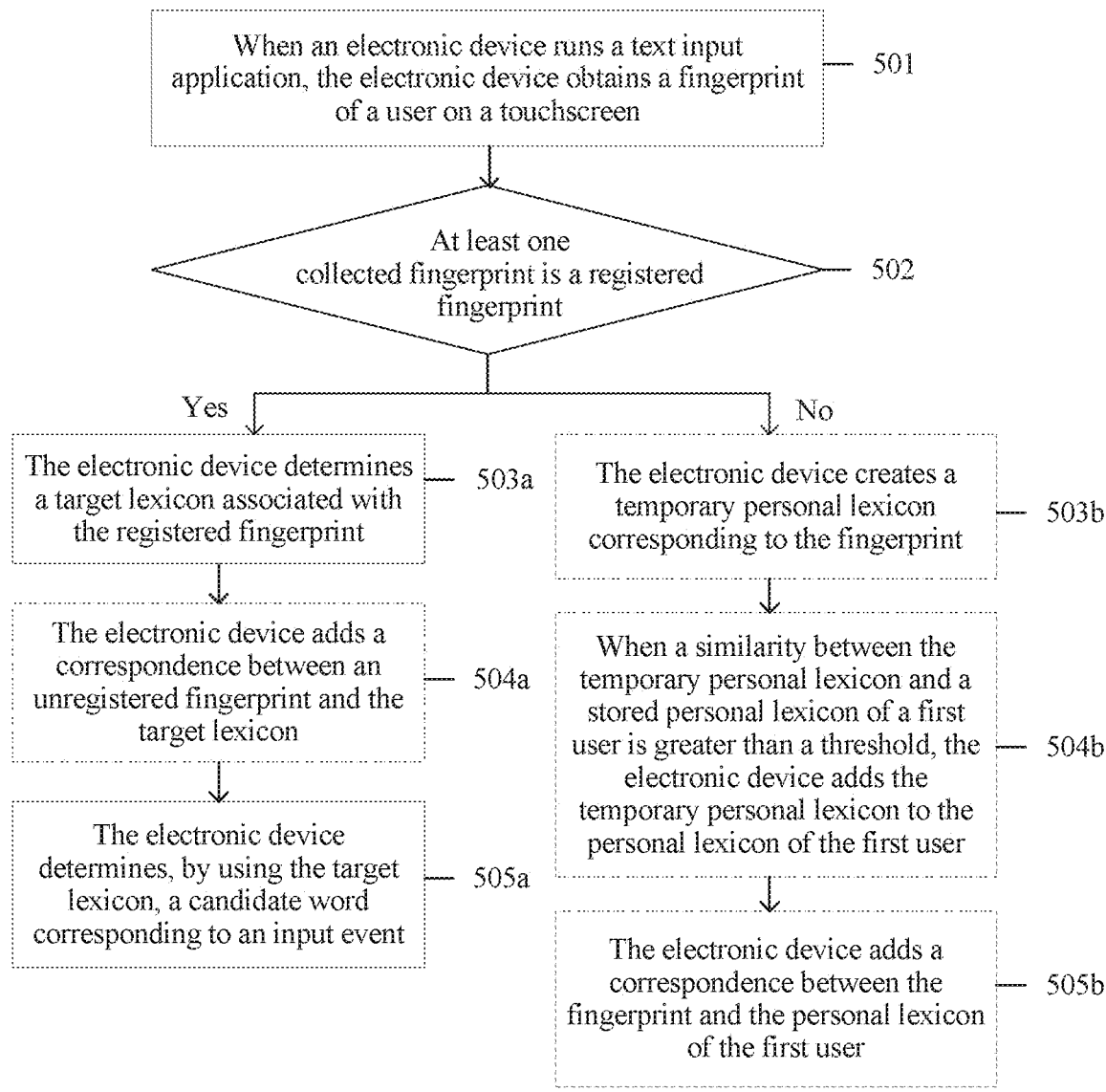
FIG. 15 is a schematic flowchart 2 of an input method according to an embodiment of this application.

FIG. 15 shows an input method according to some other embodiments of this application. The method may include the following steps.

501. When an electronic device runs a text input application, the electronic device obtains a fingerprint of a user on a touchscreen.

Figure 16:
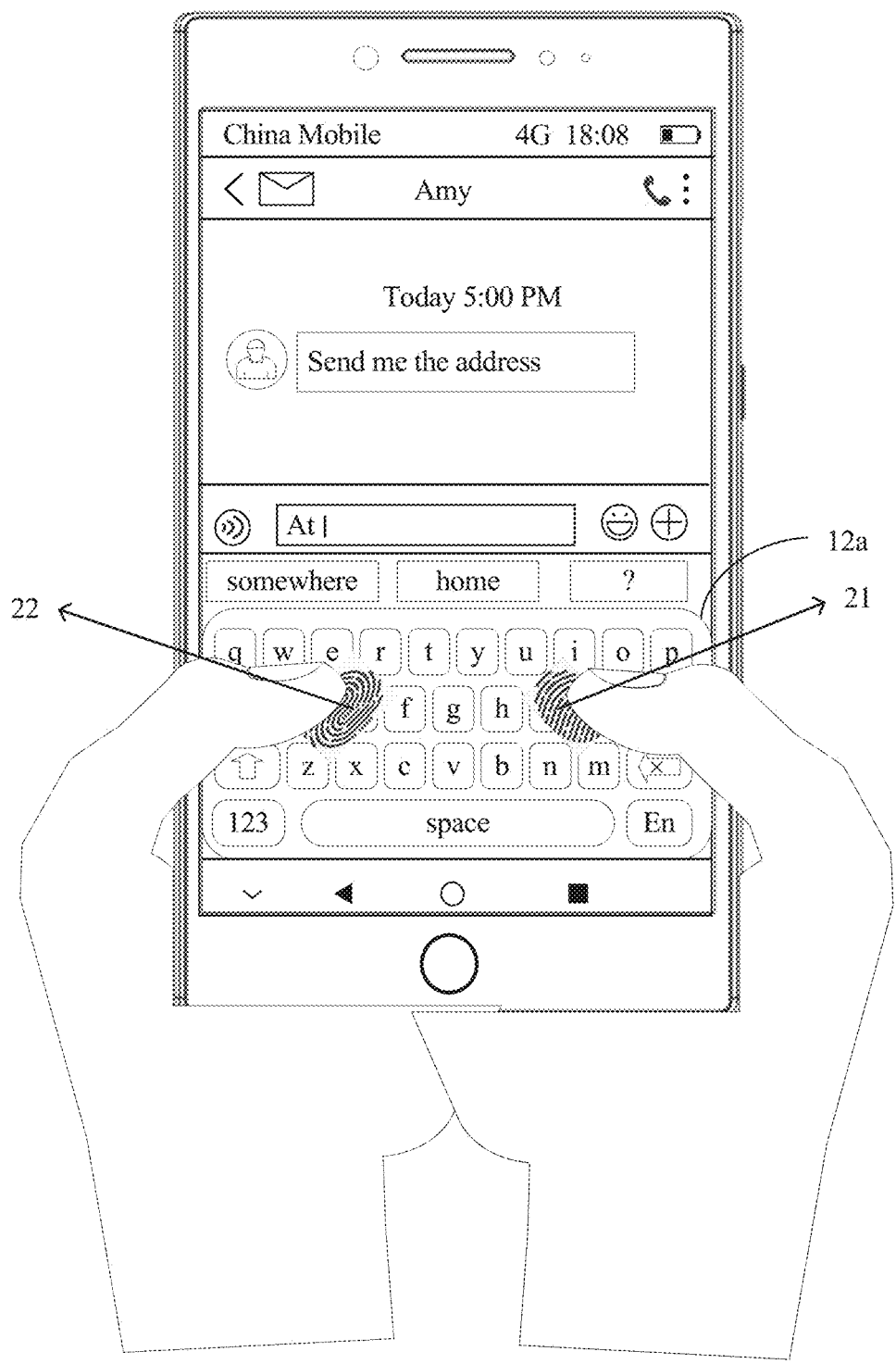
FIG. 16 is a schematic diagram 9 of an application scenario of an input method according to an embodiment of this application.

In this embodiment of this application, there are two or even more fingerprints obtained from the touchscreen, namely, N (an integer greater than 1) fingerprints. For example, as shown in FIG. 16, the user performs an input event on a virtual keyboard 12*a* of the text input application by using a thumb of a left hand and a thumb of a right hand. In this case, the electronic device may obtain a fingerprint 21 and a fingerprint 22 by using a fingerprint collection device (not shown in FIG. 16) integrated into the touchscreen.

502. The electronic device performs fingerprint identification on the obtained fingerprint.

For a method for comparing the obtained fingerprint with a registered fingerprint by the electronic device and a method for determining whether the obtained fingerprint is a registered fingerprint, refer to a related description in step 402. Therefore, details are not described herein again.

When at least one of the plurality of collected fingerprints is a registered fingerprint, for example, still as shown in FIG. 16, the electronic device may store only the fingerprint 21. Therefore, the electronic device may determine, by comparing the obtained fingerprints with the prestored registered fingerprint, that the fingerprint 21 is a registered fingerprint and the fingerprint 22 is an unregistered fingerprint on the electronic device. In this case, the electronic device may continue to perform the following steps 503a to 505a.

503a. The electronic device determines a target lexicon associated with the registered fingerprint.

Because the fingerprint 21 and the fingerprint 22 appear in a process of a change from displaying the virtual keyboard 12a of the text input application by the electronic device to hiding the virtual keyboard 12a, and the process is usually performed by a single user, a user corresponding to the fingerprint 21 and a user corresponding to the fingerprint 22 may be considered to be the same, and further, the electronic device may use, based on the correspondence shown in Table 1 or Table 2, a personal lexicon corresponding to the fingerprint 21 (a registered fingerprint) as the target lexicon.

Alternatively, if the fingerprint 21 and the fingerprint 22 appear in a preset time period starting from a latest touch of the user on the virtual keyboard 12a, for example, if the electronic device collects the fingerprint 21 and the fingerprint 22 within two seconds after the user touches the virtual keyboard 12a, a user corresponding to the fingerprint 21 and a user corresponding to the fingerprint 22 may be considered to be the same.

504a. The electronic device establishes a correspondence between an unregistered fingerprint and the target lexicon.

Similar to step 407, when the electronic device determines that the user corresponding to the fingerprint 21 and the user corresponding to the fingerprint 22 are the same, for example, when both the fingerprint 21 and the fingerprint 22 are corresponding to a user Tom, the electronic device may update the correspondence between a registered fingerprint and a personal lexicon, to be specific, the electronic device adds a correspondence between the fingerprint 22 and a personal lexicon of Tom based on a correspondence between the fingerprint 21 and the personal lexicon of Tom, so that the electronic device can accurately invoke a corresponding target lexicon subsequently based on an updated correspondence.

In other words, when the N fingerprints include X (X≥1) registered fingerprints and Y (Y≥1, and X+Y=N) unregistered fingerprints, the electronic device may establish a correspondence between the Y unregistered fingerprints and the target lexicon in the correspondence.

Figure 17:
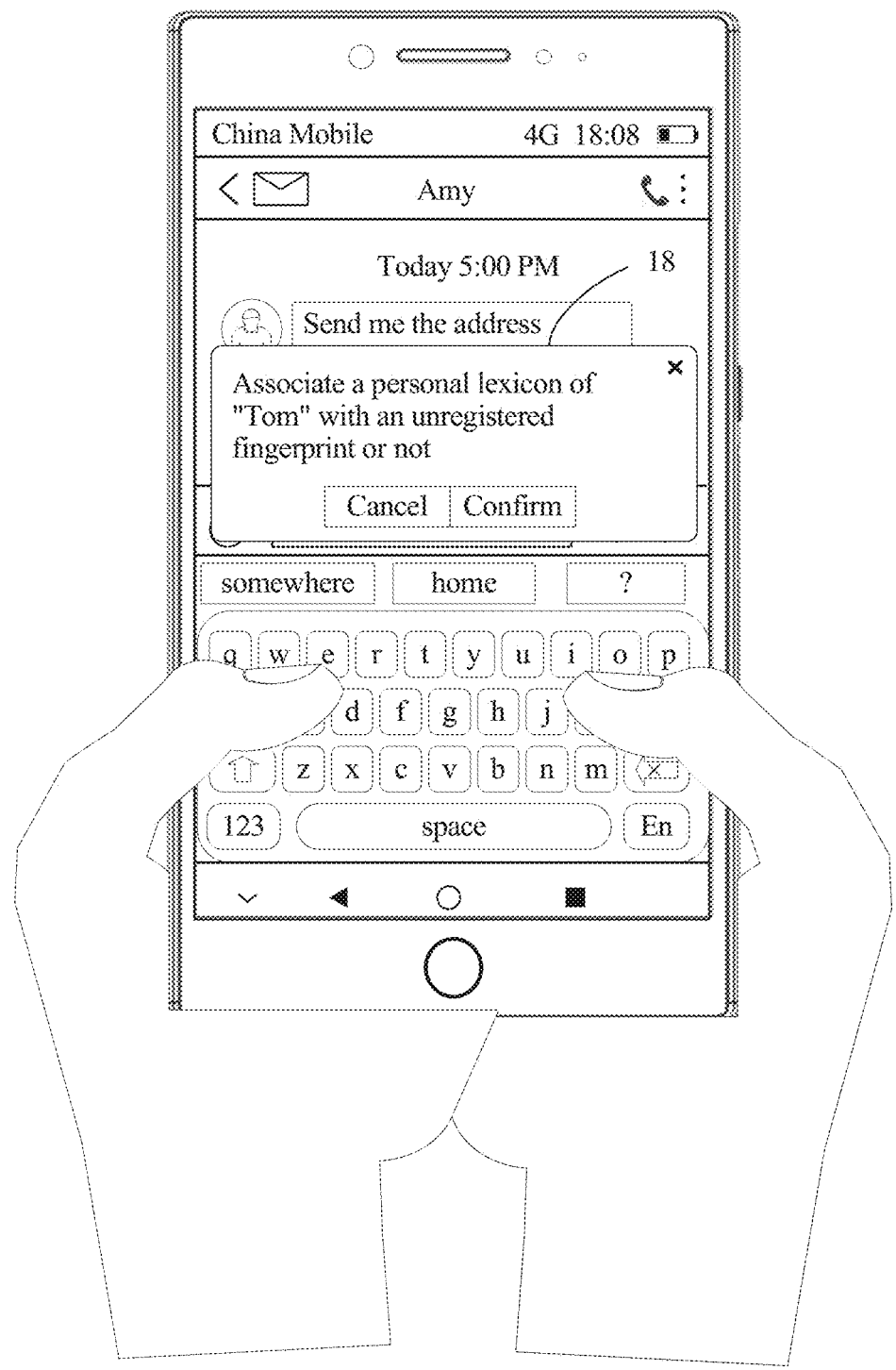
FIG. 17 is a schematic diagram 10 of an application scenario of an input method according to an embodiment of this application.

In an embodiment of this application, as shown in FIG. 17, the electronic device may prompt, in a display interface by using a prompt box 18, the user to determine whether to associate the unregistered fingerprint, namely, the unregistered fingerprint 22, with the personal lexicon of Tom. After the user determines to perform association, the electronic device adds the correspondence between the fingerprint 22 and the personal lexicon of Tom. In this way, the fingerprint 22 also becomes a registered fingerprint corresponding to the personal lexicon of Tom.

In an embodiment of this application, if the electronic device stores the fingerprint 21 and the fingerprint 22, in other words, when the plurality of collected fingerprints are all registered fingerprints, if the fingerprint 21 and the fingerprint 22 are corresponding to different personal lexicons, it indicates that the electronic device incorrectly considers the fingerprint 21 and the fingerprint 22 as fingerprints of two different users. Therefore, the electronic device may combine the personal lexicon corresponding to the fingerprint 21 and the personal lexicon corresponding to the fingerprint 22, so that both the personal lexicon corresponding to the fingerprint 21 and the personal lexicon corresponding to the fingerprint 22 are the personal lexicons of Tom.

In other words, when the N fingerprints include Z (1<Z≤N) registered fingerprints, if there are different personal lexicons in personal lexicons corresponding to registered fingerprints in the Z registered fingerprints, the electronic device may combine a plurality of personal lexicons corresponding to the Z registered fingerprints into one personal lexicon.

505a. The electronic device determines, by using the target lexicon, a candidate word corresponding to an input event.

Figure 18:
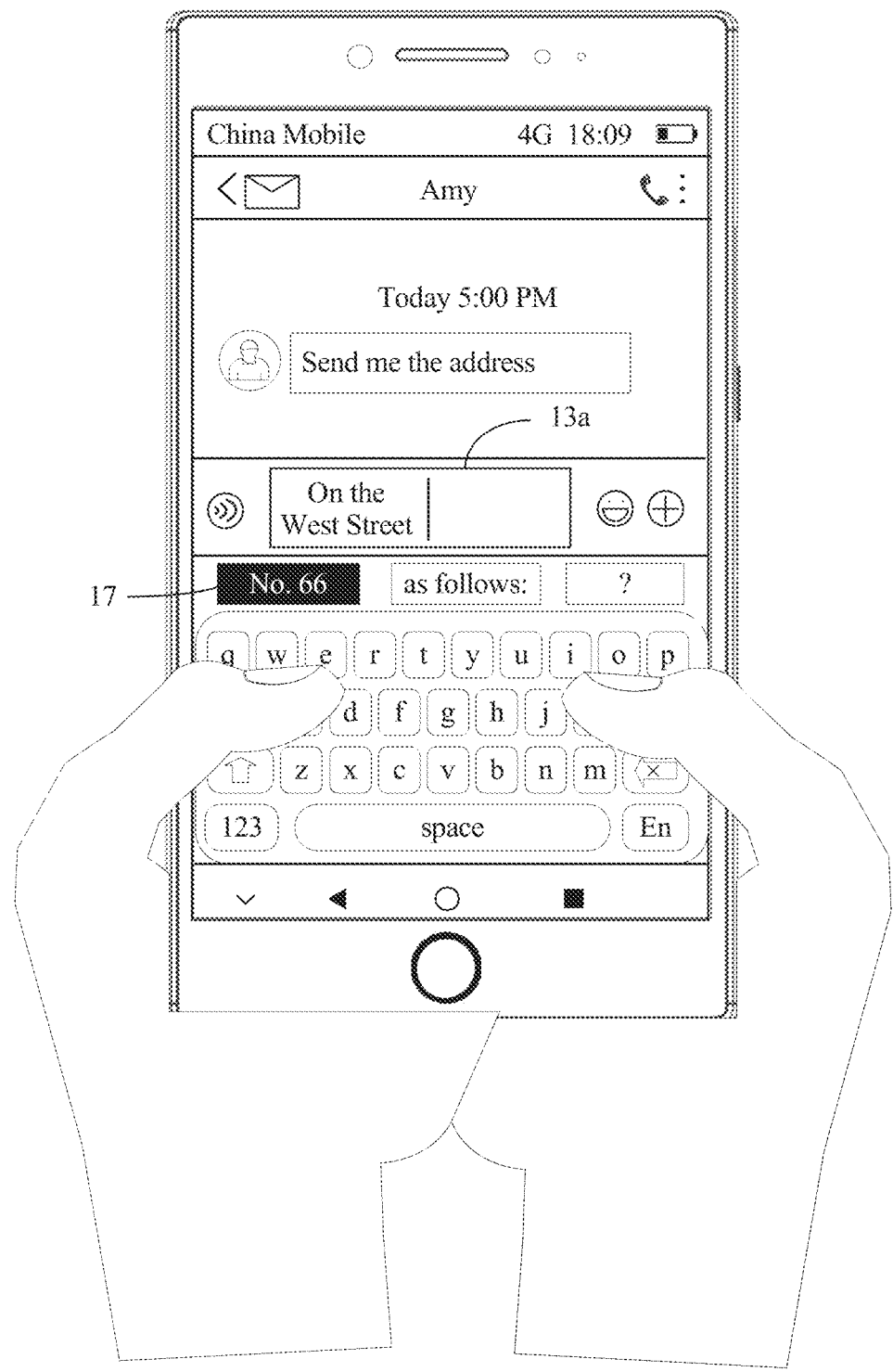
FIG. 18 is a schematic diagram 11 of an application scenario of an input method according to an embodiment of this application.

For example, the electronic device may determine, by using the target lexicon determined in step 503, namely, the personal lexicon of Tom, the candidate word corresponding to the input event. As shown in FIG. 18, "No. 66 West Street" is a frequently used word in the personal lexicon of Tom. Therefore, after the user enters "West Street" in an editing window 13a, the electronic device may display, based on the personal lexicon of Tom, "No. 66" in a candidate window as a first candidate word 17 for selection by the user, thereby improving input efficiency of the user.

In an embodiment of this application, after performing step 502, the electronic device separately compares the plurality of obtained fingerprints with prestored registered fingerprints. If it is determined that there is no registered fingerprint in the plurality of fingerprints, for example, both the fingerprint 21 and the fingerprint 22 obtained by the electronic device in FIG. 16 are unregistered fingerprints, the electronic device may continue to perform the following steps 503b and 504b.

503b. The electronic device creates a temporary personal lexicon corresponding to all the plurality of collected fingerprints.

Similar to step 405, when the plurality of collected fingerprints include no registered fingerprint, it indicates that a fingerprint of an operating finger of the current user is not registered with the electronic device.

Therefore, in step 405, the electronic device may consider the current user as a new user, and learn an input habit of the current user based on a default lexicon, to create a temporary personal lexicon corresponding to the collected fingerprint in step 501.

Figure 19:
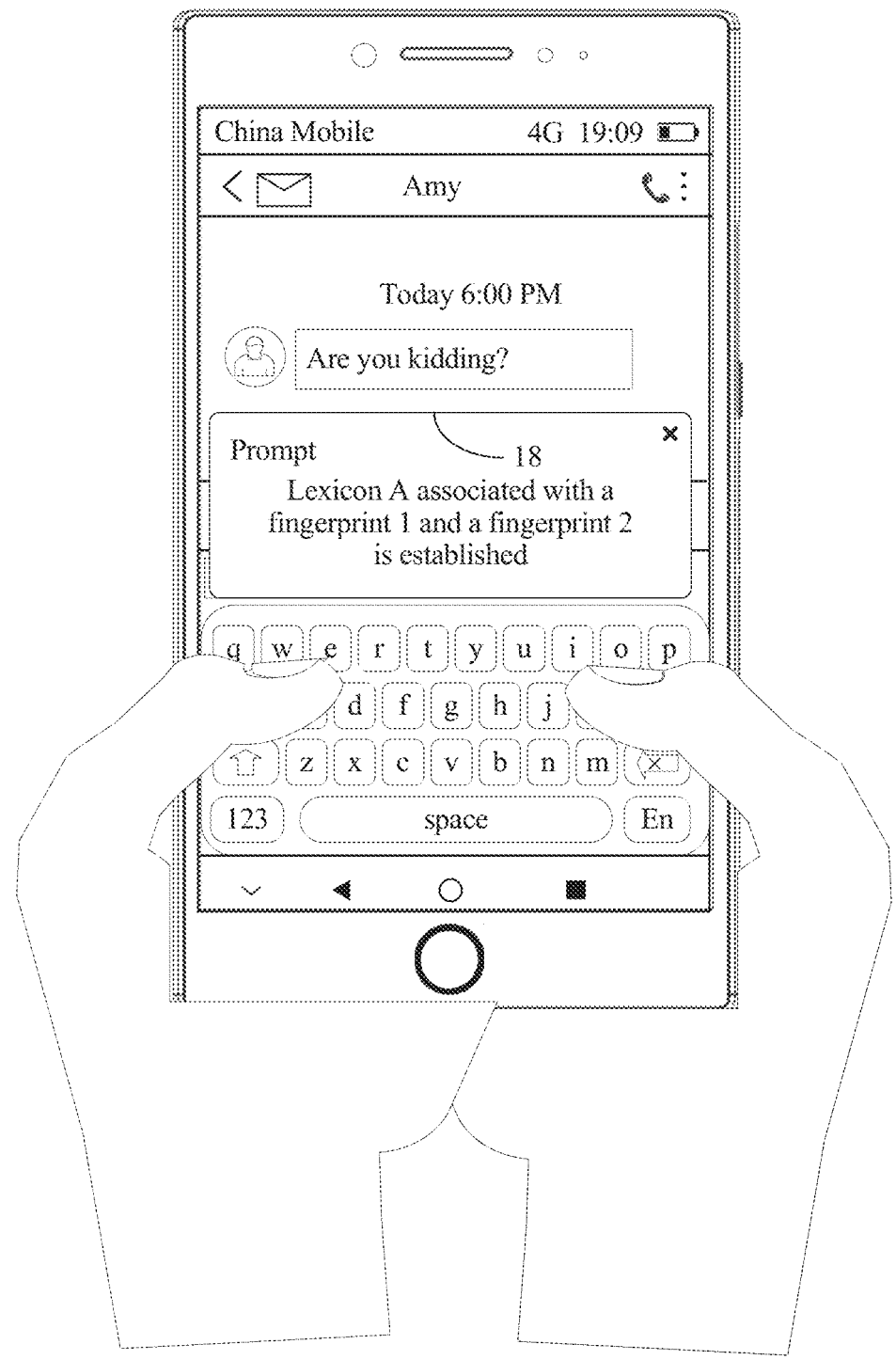
FIG. 19 is a schematic diagram 12 of an application scenario of an input method according to an embodiment of this application.

In this case, as shown in FIG. 19, the electronic device may prompt, in a display interface by using a prompt box 18, the user to determine whether to create a lexicon A associated with the fingerprint 21 and the fingerprint 22. After the user determines to create the lexicon A, subsequently, each time a user input event with the fingerprint is received, the electronic device learns the input habit of the user based on the default lexicon, and after a period of time, the electronic device may obtain a temporary personal lexicon that belongs to the user, namely, the lexicon A.

504b. When a similarity between the temporary personal lexicon and a stored personal lexicon of a first user is greater than a threshold, the electronic device adds the temporary personal lexicon to the personal lexicon of the first user.

Figure 20:
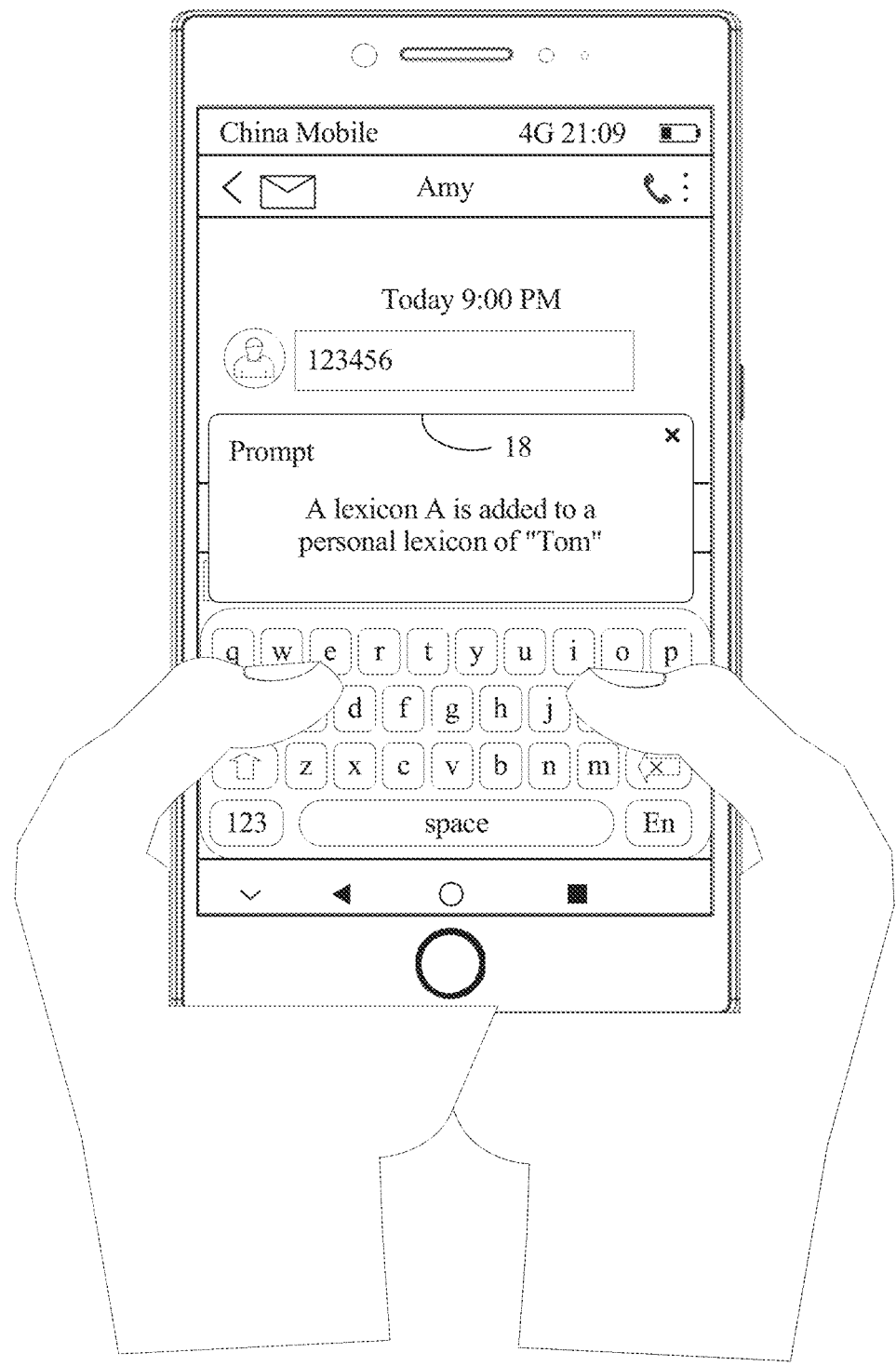
FIG. 20 is a schematic diagram 13 of an application scenario of an input method according to an embodiment of this application.

Specifically, the electronic device may periodically or non-periodically compare the created temporary personal lexicon in step 503b with a stored personal lexicon of each user. When the similarity between the temporary personal lexicon and the stored personal lexicon of the first user (for example, Tom) is greater than the threshold, it indicates that the input habit of the user corresponding to the plurality of collected fingerprints is very similar to an input habit of Tom. Therefore, the electronic device may consider that the user with the plurality of fingerprints is Tom. In this case, as shown in FIG. 20, the electronic device may log in to the personal lexicon of Tom, and add the lexicon A to the personal lexicon of Tom, to complete update of the personal lexicon of Tom.

505*b*. The electronic device establishes a correspondence between the plurality of collected fingerprints and the personal lexicon of the first user.

After the electronic device adds the temporary personal lexicon to the personal lexicon of the first user, the electronic device may update a correspondence between a registered fingerprint and a personal lexicon, so that the electronic device can accurately invoke a corresponding target lexicon based on an updated correspondence when subsequently receiving a new input event.

Figure 21:
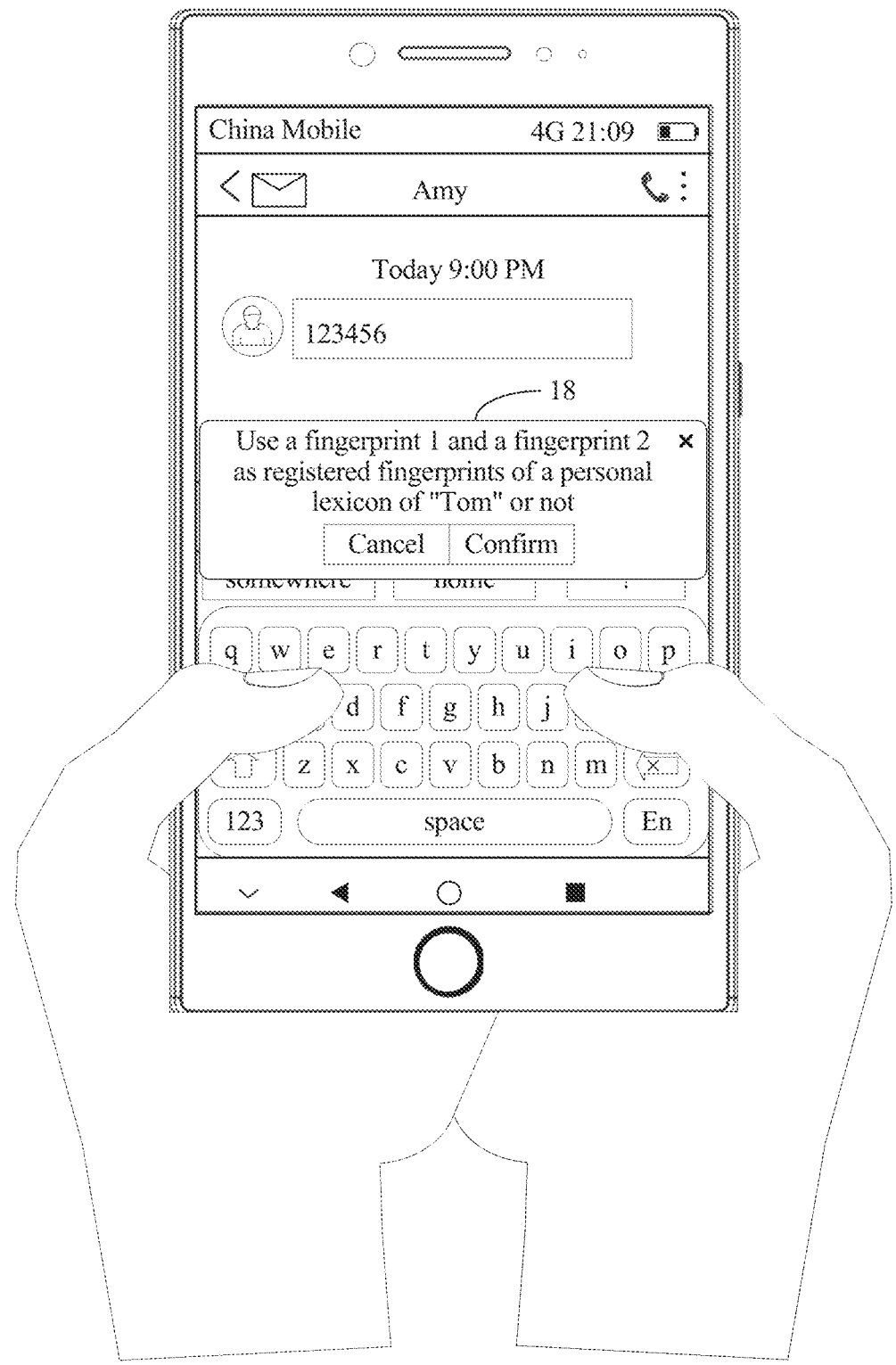
FIG. 21 is a schematic diagram 14 of an application scenario of an input method according to an embodiment of this application.

For example, as shown in FIG. 21, the electronic device may further prompt, by using a prompt box 18, the user to determine whether to add the fingerprint 21 and the fingerprint 22 (in other words, fingerprints collected in a current input operation) to serve as registered fingerprints of the text input application. If the user determines to add the fingerprint 21 and the fingerprint 22 to serve as registered fingerprints of the text input application, the user may subsequently log in to the personal lexicon of the user by using the fingerprint 21 or the fingerprint 22.

Certainly, the electronic device may further use the collected fingerprint to perform a function such as fingerprint unlocking or fingerprint payment. Alternatively, when the user records, in the electronic device, a fingerprint used for fingerprint unlocking or fingerprint identification, the electronic device may prompt that the fingerprint is used as a registered fingerprint of the text input application, and establish a correspondence between the fingerprint and a personal lexicon corresponding to the fingerprint. This is not limited in this embodiment of this application.

Figure 22:
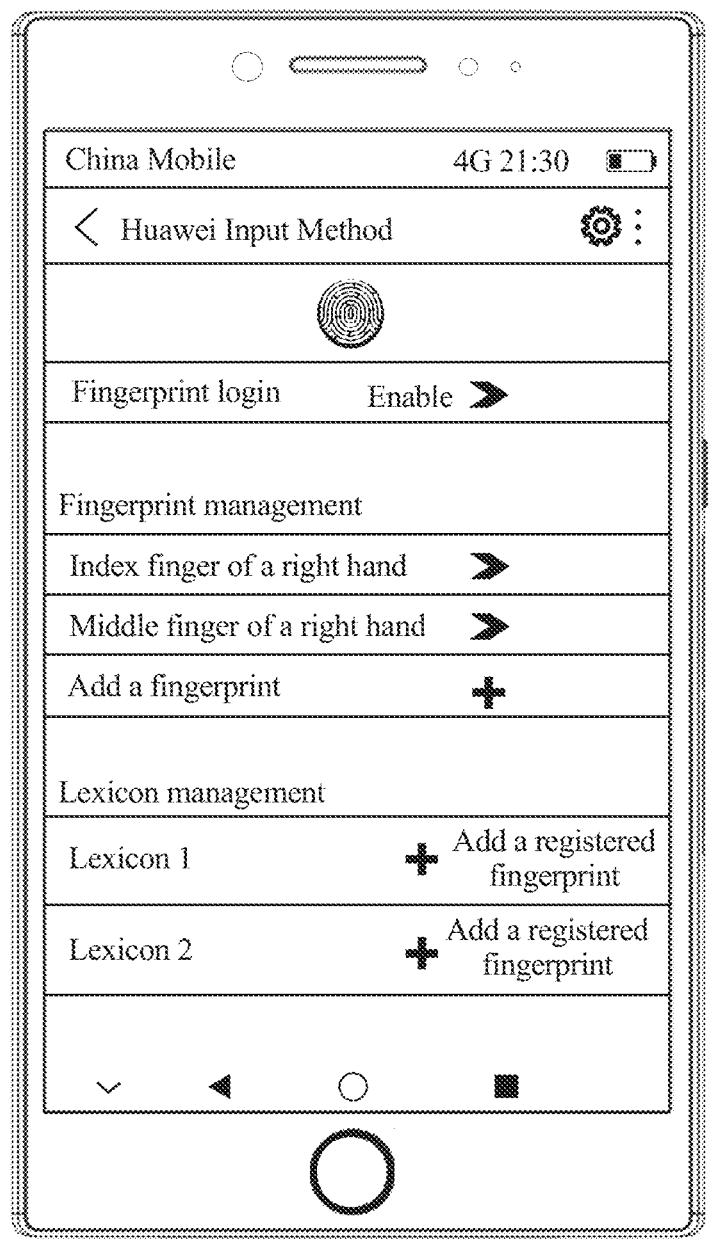
FIG. 22 is a schematic diagram 15 of an application scenario of an input method according to an embodiment of this application.

Further, as shown in FIG. 22, the user may further enable or disable, by using a setting interface of the text input application, a fingerprint login function shown in the foregoing embodiments. In addition, the user may manage the registered fingerprint, for example, add or delete a registered fingerprint. Alternatively, the user may manage a relationship between an established personal lexicon and a registered fingerprint. For example, one user may have one or more personal lexicons, for example, a lexicon 1 and a lexicon 2 shown in FIG. 22. For each personal lexicon, a registered fingerprint corresponding to each personal lexicon may be manually set. In this way, when a finger with a different fingerprint is used to trigger an input event, a different lexicon may be invoked to determine a corresponding candidate word for the input event, thereby improving input efficiency of the input method and human-machine interaction intelligence.

Figure 23:
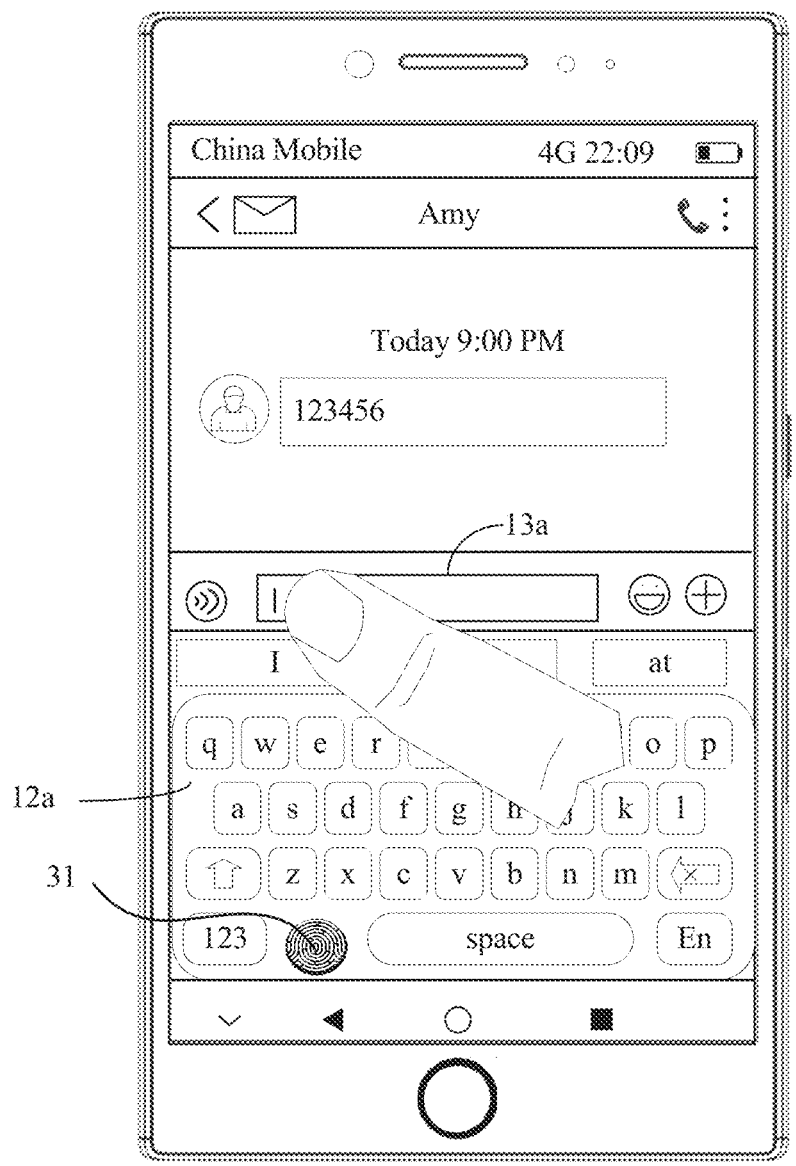
FIG. 23 is a schematic diagram 16 of an application scenario of an input method according to an embodiment of this application.

In some other embodiments of this application, as shown in FIG. 23, after the user triggers an editing window 13*a* of an app (for example, a short message application in FIG. 23), the short message application invokes an API of the text input application to display a related graphical user interface such as the virtual keyboard 12*a* of the text input application. In this case, a shortcut login button used to quickly log in to a personal lexicon may be further set in the graphical user interface. For example, the shortcut login button may be a fingerprint pattern 31 in FIG. 23, and when the user touches the fingerprint pattern 31, the electronic device triggers a fingerprint collection device at the fingerprint pattern 31 in response to the touch operation to collect a fingerprint of the user, and may further invoke, by using the input method shown in steps 402 to 407, a personal lexicon corresponding to the collected fingerprint to provide a candidate word. For example, after detecting the touch operation performed by the user at the fingerprint pattern 31, the electronic device collects the fingerprint by using the fingerprint collection device at the fingerprint pattern 31, and performs fingerprint identification on the collected fingerprint. When identifying that the collected fingerprint is a fingerprint (for example, the fingerprint 1 in Table 1) of Tom, the electronic device may log in to the personal lexicon (namely, the lexicon 1) of Tom based on a correspondence between the fingerprint 1 and the personal lexicon of Tom, and determine, by invoking the lexicon 1, a candidate word associated with a subsequently received input event.

Figure 24:
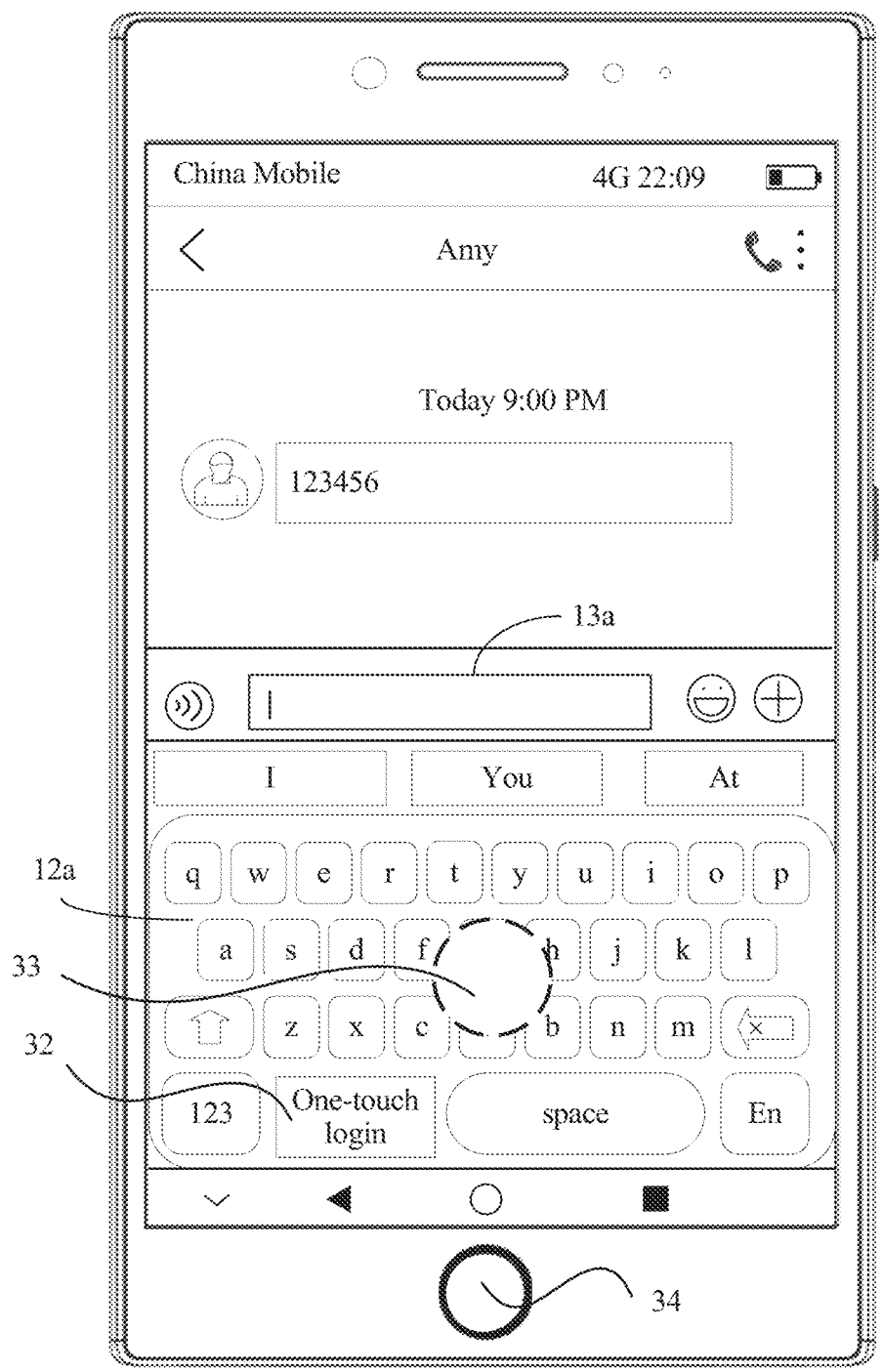
FIG. 24 is a schematic diagram 17 of an application scenario of an input method according to an embodiment of this application.

In another embodiment of this application, no fingerprint collection device may be disposed at a position used for displaying the shortcut login button (for example, a one-touch login button 32 in FIG. 24). Therefore, after the user taps the one-touch login 32, the electronic device may prompt the user to record a fingerprint at a position at which the fingerprint collection device is disposed. For example, the user records the fingerprint in an area (for example, an area 33 in FIG. 24) within the touchscreen or an area outside the touchscreen (for example, a home key 34 in FIG. 24). Subsequently, the electronic device performs fingerprint identification on the collected fingerprint, and when identifying that the collected fingerprint is a fingerprint (for example, the fingerprint 3 in Table 1) of Alice, the electronic device may log in to a personal lexicon (namely, the lexicon 2) of Alice based on a correspondence between the fingerprint 3 and the personal lexicon of Alice, and determine, by invoking the lexicon 2, a candidate word associated with a subsequently received input event.

In another embodiment of this application, if the electronic device has a fingerprint unlocking function, the electronic device may collect a fingerprint of the user when the user performs fingerprint unlocking, and further use, as a target lexicon by using the input method shown in steps 402 and 403, a personal lexicon corresponding to the fingerprint collected during unlocking. In this way, when an app invokes an API of the input method to display a related graphical user interface of the text input application, the text input application can provide a candidate word by using the determined target lexicon, to shorten a time of a process of logging in to the personal lexicon by the user, thereby improving input efficiency.

Certainly, if the text input application detects, in a running process, that a fingerprint in a current input event is different from the fingerprint used during unlocking, the text input application may automatically switch to a personal lexicon corresponding to the fingerprint in the current input event, so that a user performing the current input event can complete input by using a personal lexicon that conforms to an input habit of the user.

In addition, in the foregoing embodiment, the correspondence between a fingerprint of a different user and a personal lexicon of the different user is used as only an example to describe a manner in which the text input application calls, based on the fingerprint of the user, the corresponding personal lexicon to complete input. It may be understood that in a text input application scenario, a correspondence between a customized setting parameter (for example, settings of an input method skin, a display position of a virtual keyboard, a shortcut key, and the like) of the user and the fingerprint of the user may be further established.

For example, a registered fingerprint of a user A is corresponding to a virtual keyboard in a nine-square grid form, and a registered fingerprint of a user B is corresponding to a virtual keyboard in a complete keyboard form. Therefore, when collecting a same fingerprint as the registered fingerprint of the user A, the electronic device may display a virtual keyboard in a nine-square grid form in a display interface; or when collecting a fingerprint the same as the registered fingerprint of the user B, the electronic device may display a virtual keyboard in a full keyboard form in a display interface.

In conclusion, when performing the input event by using the text input application, the user may set, by using the fingerprint formed on the touchscreen, a related parameter of the text input application to the customized setting parameter corresponding to the fingerprint, so that the text input application can better provide, in a running process, an input environment, a candidate word, and the like that conform to the input habit of the current user, thereby improving input efficiency when the user uses the text input application, and significantly improving user experience.

It may be understood that to implement the foregoing functions, the foregoing electronic device includes a corresponding hardware structure and/or software module for performing each of the functions. A person skilled in the art should be easily aware that the units and algorithm steps in the examples described with reference to the embodiments disclosed in the embodiments of specification may be implemented by hardware or a combination of hardware and computer software in the embodiments of this application. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the embodiments of this application.

In the embodiments of this application, the foregoing electronic device and the like may be divided into function modules based on the foregoing method examples. For example, each function module may be obtained through division for a corresponding function, or two or more functions may be integrated into one processing module. The integrated module may be implemented in a form of hardware, or may be implemented in a form of a software function module. It should be noted that the module division in the embodiments of this application is an example, and is merely logical function division. There may be another division manner in an actual implementation.

Figure 25:
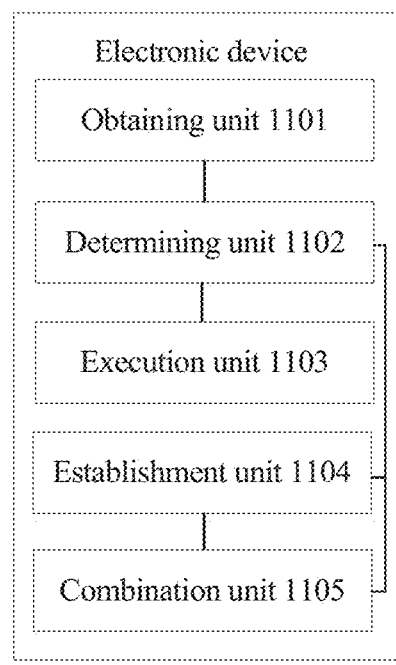
FIG. 25 is a schematic structural diagram 2 of an electronic device according to an embodiment of this application.

When each function module is obtained through division for each corresponding function, FIG. 25 is a possible schematic structural diagram of an electronic device used in the foregoing embodiments. The electronic device includes an obtaining unit 1101, a determining unit 1102, an execution unit 1103, an establishment unit 1104, and a combination unit 1105.

The obtaining unit 1101 is configured to support the electronic device in executing a process 401 in FIG. 6 and a process 501 in FIG. 15. The determining unit 1102 is configured to support the electronic device in executing processes 402 and 403 in FIG. 6, and processes 502 and 503*a* in FIG. 15. The execution unit 1103 is configured to support the electronic device in executing a process 404 in FIG. 6, and a process 505*a* in FIG. 15. The establishment unit 1104 is configured to support the electronic device in executing processes 405 and 407 in FIG. 6, and processes 503*b*, 505*b*, and 504*a* in FIG. 15. The combination unit 1105 is configured to support the electronic device in executing a process 406 in FIG. 6, and a process 504*b* in FIG. 15. For function descriptions of the corresponding function modules, refer to any content related to the steps in the foregoing method embodiments. Details are not described herein again.

Figure 26:
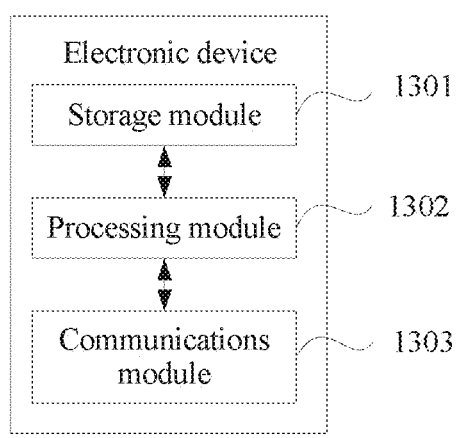
FIG. 26 is a schematic structural diagram 3 of an electronic device according to an embodiment of this application.

When an integrated unit is used, FIG. 26 is a possible schematic structural diagram of an electronic device used in the foregoing embodiments. The electronic device includes a processing module 1302 and a communications module 1303. The processing module 1302 is configured to control and manage an action of the electronic device. The communications module 1303 is configured to support the electronic device in communicating with another network entity. The electronic device may further include a storage module 1301, configured to store program code and data of the electronic device.

The processing module 1302 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 1302 may implement or execute various examples of logical blocks, modules, and circuits that are described with reference to the content disclosed in this application. The processor may alternatively be a combination implementing a computing function, for example, a combination of one or more microprocessors or a combination of a DSP and a microprocessor. The communications module 1303 may be a transceiver, a transceiver circuit, a communications interface, or the like. The storage module 1301 may be a memory.

When the processing module 1302 is a processor, the communications module 1303 is an RF transceiver circuit, and when the storage module 1301 is a memory, the electronic device provided in this embodiment of this application may be the electronic device shown in FIG. 4.

Some other embodiments of this application further provide a nonvolatile computer readable storage medium. The nonvolatile computer readable storage medium stores one or more programs, and the one or more programs include an instruction. When the electronic device with a display detects that a touch surface of the electronic device receives a touch event, the electronic device executes the foregoing instruction, so that the electronic device performs the input method provided in the foregoing embodiments. For steps of the foregoing input method, refer to related descriptions of steps 401 to 407 and/or steps 501 to 505. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. An input method implemented by an electronic device having a fingerprint collection device, the input method comprising:
obtaining, during the running of a text input application, a detected fingerprint of a first user on a touchscreen;
determining a target lexicon associated with the detected fingerprint when the detected fingerprint matches a first prestored registered fingerprint, wherein determining the target lexicon comprises determining a first personal lexicon corresponding to the detected fingerprint based on a correspondence between a second personal lexicon of a second user and a second prestored registered fingerprint of the second user;
establishing a temporary personal lexicon corresponding to the detected fingerprint when the detected fingerprint is an unregistered fingerprint; and
providing, using the target lexicon, at least one candidate word corresponding to a current input event.

2. The input method according to claim 1, wherein, after establishing the temporary personal lexicon corresponding to the unregistered fingerprint, the input method further comprises:
adding the temporary personal lexicon to the first personal lexicon when a similarity between the temporary personal lexicon and the personal lexicon is greater than a threshold; and
establishing a correspondence between the unregistered fingerprint and the first personal lexicon.

3. The input method according to claim 1, wherein there are N detected fingerprints, wherein N is an integer greater than one, and wherein determining the target lexicon comprises identifying a first personal lexicon corresponding to the first prestored registered fingerprint as the target lexicon based on a correspondence between a second personal lexicon of a second user and a second prestored registered fingerprint of the second user when one of the N detected fingerprints is the registered fingerprint.

4. The input method according to claim 3, wherein the input method further comprises establishing a correspondence between Y unregistered fingerprints and the target lexicon in the correspondence when the N detected fingerprints comprise X registered fingerprints and Y unregistered fingerprints, wherein X is an integer greater than or equal to one, wherein Y is an integer greater than or equal to one, and wherein the sum of X plus Y is equal to N.

5. The input method according to claim 3, wherein the N detected fingerprints comprise Z registered fingerprints, wherein Z is greater than one and less than or equal to N, and wherein the input method further comprises:
determining the target lexicon based on whether all of the Z registered fingerprints correspond to a same personal lexicon; and
combining personal lexicons corresponding to the Z registered fingerprints into one personal lexicon when different personal lexicons correspond to the Z registered fingerprints.

6. The input method according to claim 3, further comprising establishing a temporary personal lexicon corresponding to the N detected fingerprints when the N detected fingerprints are all unregistered fingerprints.

7. The input method according to claim 6, wherein the input method further comprises, after establishing a temporary personal lexicon corresponding to the N detected fingerprints:
adding the temporary personal lexicon to the personal lexicon of the second user when a similarity between the temporary personal lexicon and a personal lexicon of the second user is greater than a threshold; and
establishing a correspondence between the N detected fingerprints and the personal lexicon of the second user.

8. The input method according to claim 1, wherein the touchscreen comprises an area for displaying a virtual keyboard of the text input application, and wherein obtaining the detected fingerprint of a user on a touchscreen comprises obtaining the detected fingerprint when the user performs an input event in the area of the virtual keyboard.

9. An electronic device, comprising:
a touchscreen;
a processor; and
a non-volatile memory configured for storing program instructions which, when executed by the processor, cause the electronic device to:
obtain, during the running of a text input application, N detected fingerprints of a first user on a touchscreen, wherein N is an integer greater than one, and wherein the instructions further cause the electronic device to determine a first personal lexicon corresponding to the first prestored registered fingerprint as the target lexicon based on a correspondence between a personal lexicon of a second user and a second prestored registered fingerprint of the second user when one of the N detected fingerprints is the registered fingerprint;
determine a target lexicon associated with the detected fingerprint when the detected fingerprint is a first prestored registered fingerprint;
establish a correspondence between Y unregistered fingerprints and the target lexicon when the N detected fingerprints comprise X registered fingerprints and Y unregistered fingerprints, wherein X is an integer greater than or equal to one, wherein Y is an integer greater than or equal to one, and wherein the sum of X plus Y is equal to N; and
provide a candidate word corresponding to a current input event by using the target lexicon.

10. The electronic device according to claim 9, wherein the instructions further cause the electronic device to determine a first personal lexicon corresponding to the detected fingerprint as the target lexicon based on a correspondence between a personal lexicon of a second user and a second prestored registered fingerprint of the second user.

11. The electronic device according to claim 10, wherein the instructions further cause the electronic device to establish a temporary personal lexicon corresponding to the detected fingerprint when the detected fingerprint is an unregistered fingerprint.

12. The electronic device according to claim 11, wherein the instructions further cause the electronic device to:
add the temporary personal lexicon to the personal lexicon of the first user when a similarity between the temporary personal lexicon and a personal lexicon of the first user is greater than a threshold; and
establish a correspondence between the detected fingerprint and the first personal lexicon of the first user.

13. The electronic device according to claim 9, wherein the N detected fingerprints comprise Z registered fingerprints, wherein Z is greater than one and less than or equal to N, and wherein the instructions further cause the electronic device to:
determine, based on the correspondence, whether all of the Z registered fingerprints correspond to a same personal lexicon; and
combine personal lexicons corresponding to the Z registered fingerprints into one personal lexicon when different personal lexicons correspond to registered fingerprints in the Z registered fingerprints.

14. The electronic device according to claim 9, wherein the instructions further cause the electronic device to establish a temporary personal lexicon corresponding to the N detected fingerprints when the N detected fingerprints are all unregistered fingerprints.

15. The electronic device according to claim 14, wherein the instructions further cause the electronic device to:
add the temporary personal lexicon to the personal lexicon of the second user when a similarity between the temporary personal lexicon and a personal lexicon of a second user is greater than a threshold; and
establish a correspondence between the N detected fingerprints and the personal lexicon of the second user.

16. The electronic device according to claim 9, wherein the touchscreen comprises an area for displaying a virtual keyboard of the text input application, and wherein the instructions further cause the electronic device to obtain a detected fingerprint generated when the first user performs an input event in the area of the virtual keyboard.

17. An input method implemented by an electronic device having a fingerprint collection device, the input method comprising:
obtaining, during the running of a text input application, N detected fingerprints of a first user on a touchscreen, wherein N is an integer greater than one;
determining a target lexicon associated with the N detected fingerprints when one detected fingerprint matches a first prestored registered fingerprint, wherein determining the target lexicon comprises identifying a first personal lexicon corresponding to the first prestored registered fingerprint as the target lexicon based on a correspondence between a second personal lexicon of a second user and a second prestored registered fingerprint of the second user when one of the N detected fingerprints is the registered fingerprint;
establishing a temporary personal lexicon corresponding to the N detected fingerprints when the N detected fingerprints are all unregistered fingerprint;
adding the temporary personal lexicon to the personal lexicon of the second user when a similarity between the temporary personal lexicon and a personal lexicon of the second user is greater than a threshold;
establishing a correspondence between the N detected fingerprints and the personal lexicon of the second user; and
providing, using the target lexicon, at least one candidate word corresponding to a current input event.

18. The input method according to claim 17, wherein determining the target lexicon associated with the detected fingerprint comprises determining a first personal lexicon corresponding to the detected fingerprint as the target lexicon based on a correspondence between a second personal lexicon of a second user and a second prestored registered fingerprint of the second user.

19. The input method according to claim 18, further comprising establishing a temporary personal lexicon corresponding to the detected fingerprint when the detected fingerprint is an unregistered fingerprint.

20. The input method according to claim 19, wherein, after establishing the temporary personal lexicon corresponding to the unregistered fingerprint, the input method further comprises:
adding the temporary personal lexicon to the first personal lexicon when a similarity between the temporary personal lexicon and the personal lexicon is greater than a threshold; and
establishing a correspondence between the unregistered fingerprint and the first personal lexicon.

* * * * *